United States Patent
Brewer et al.

(10) Patent No.: US 6,711,357 B1
(45) Date of Patent: Mar. 23, 2004

(54) TIMING AND SYNCHRONIZATION FOR AN IP ROUTER USING AN OPTICAL SWITCH

(75) Inventors: Tony Brewer, Plano, TX (US); Harry C. Blackmon, Plano, TX (US); Harold W. Dozier, Dallas, TX (US); William D. O'Leary, Plano, TX (US); Dean E. Walker, Plano, TX (US)

(73) Assignee: Chiaro Networks Ltd., Richardson, TX (US)

( * ) Notice: Subject to any disclaimer, the term of this patent is extended or adjusted under 35 U.S.C. 154(b) by 574 days.

(21) Appl. No.: 09/702,958

(22) Filed: Oct. 31, 2000

(51) Int. Cl.[7] .................................................. H04J 14/00
(52) U.S. Cl. ...................... 398/54; 398/154; 370/401; 370/389; 370/392
(58) Field of Search ................................ 370/401, 392, 370/389; 398/54, 98, 154, FOR 130

(56) References Cited

U.S. PATENT DOCUMENTS

| | | | | |
|---|---|---|---|---|
| 5,485,298 A | * | 1/1996 | Haas ........................... | 398/54 |
| 5,781,745 A | * | 7/1998 | Ramelson et al. .......... | 710/113 |
| 5,793,510 A | * | 8/1998 | Samejima et al. .......... | 398/154 |
| 6,285,673 B1 | * | 9/2001 | Blackburn et al. .......... | 370/360 |
| 6,333,940 B1 | * | 12/2001 | Baydar et al. .............. | 370/506 |
| 6,393,026 B1 | * | 5/2002 | Irwin .......................... | 370/401 |
| 6,512,616 B1 | * | 1/2003 | Nishihara .................... | 398/54 |

\* cited by examiner

Primary Examiner—Hung N. Ngo
(74) Attorney, Agent, or Firm—Fulbright & Jaworski L.L.P.

(57) ABSTRACT

Information and control are synchronized as they flow through a large distributed IP router system with independent clocks. The IP router includes multiple equipment racks and shelves, each containing multiple modules. The IP router is based on a passive switching device, which in some embodiments is an optical switch. Control and data come to the switching device from different sources, which have different clocks. Timing and synchronization control are provided, such that information and control both arrive at the switching device at the proper time. A single point in the system originates timing, which is then distributed through various ASICs of the system to deliver configuration control to the switch at the appropriate time. The launch of information to the switch is also controlled with a dynamic feedback loop from an optical switch controller. Control aspects of the optical switch are aligned by this same mechanism to deliver control and data to the optical switch simultaneously.

81 Claims, 8 Drawing Sheets

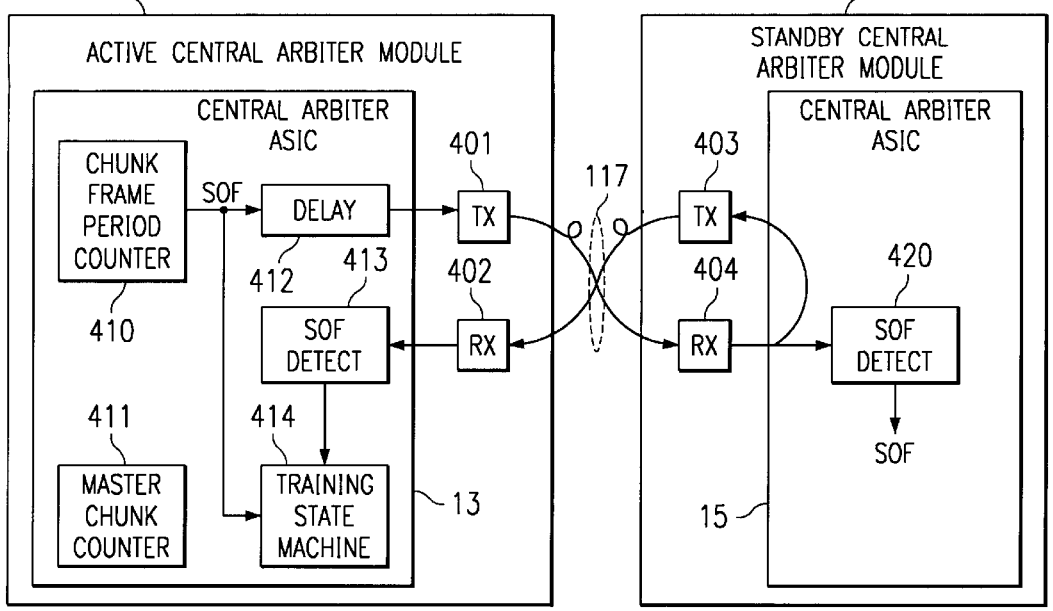
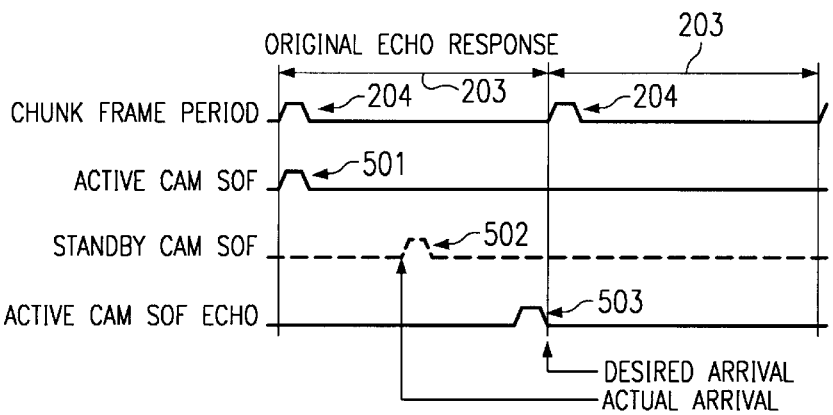
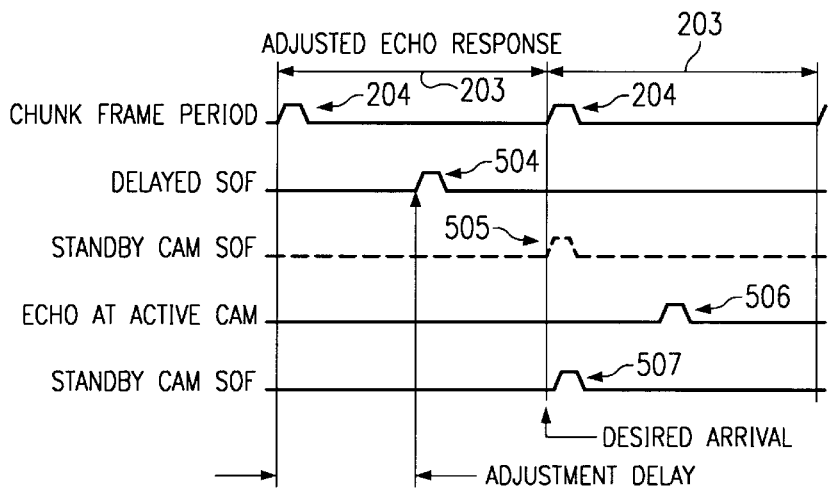
FIG. 5

TIMING AND SYNCHRONIZATION FOR AN IP ROUTER USING AN OPTICAL SWITCH

RELATED APPLICATIONS

This application is related co-pending to and commonly assigned U.S. application Ser. No. 09/703,057, filed Oct. 31, 2000, entitled "System And Method For IP Router With an Optical Core," co-pending and commonly assigned U.S. application Ser. No. 09/703,056, filed Oct. 31, 2000, entitled "System and Method for Router Central Arbitration," co-pending and commonly assigned U.S. application Ser. No. 09/703,038, filed Oct. 31, 2000, entitled "System and Method for Router Data Aggregation and Delivery," co-pending and commonly assigned U.S. application Ser. No. 09/703,027, filed Oct. 31, 2000, entitled "Router Network Protection Using Multiple Facility Interfaces," to co-pending and commonly assigned U.S. application Ser. No. 09/703,043, filed Oct. 31, 2000, entitled "Router Line Card Protection Using One-for-N Redundancy" and to co-pending and commonly assigned U.S. application Ser. No. 09/703,064, filed Oct. 31, 2000, entitled "Router Switch Fabric Protection Using Forward Error Correction," the disclosures of which are incorporated herein by reference.

TECHNICAL FIELD

This application relates to the field of optical communication networks, and particularly to large-scale routers for optical communication networks.

BACKGROUND

Internet Protocol (IP) packets are unique in the sense that they each have an IP header at the beginning, and they are variable in length. The shortest are on the order of 40 to 64 bytes and the longest can be up to 9600 bytes (known as a "jumbo frame" length) or potentially longer. In the communications industry today, a standard IP Packet is 1500 bytes maximum length, and a jumbo packet is 9600 bytes. Current non-IP packets include frame relay and ATM packets used with ATM routers. They have different sizes of packets. Some are fixed size but small, they have different characteristics, and their headers have different information in them.

A router is a broad term for a network component that takes information from multiple sources and it routes it to multiple destinations within the network. An IP router takes IP packets specifically and routes them through to various network destinations.

A fabric is a collection of devices which cooperatively provide a general routing capability. One example of a fabric with these properties is a centralized crossbar. Electrical crossbars typically have scalability limitations, limiting their size to tens of ports. In order to scale to larger systems, prior routers have used distributed switching fabrics. These fabrics typically have multiple arbitration points to traverse the fabric, resulting in increased fabric latency and congestion hot spots within the fabric.

An IP router using an optical switch fabric takes in Internet Protocol packets and routes them through an optical switch to various destination ports of the switch. This routing relies on an address location in each packet which is decoded from the packet, compared with a database of address locations, and then used to send the packet on its way to a next router.

Typically, after a packet enters a router, the data and the address of the packet are separated from each other. The address is compared with a look-up table to identify the preferred next router. If that router is available and the links to that router are available and not congested, the router then operates to send the packet to that preferred router. On the other hand, if the preferred next router is clogged, broken, or otherwise unavailable, then the router operates to send the packet through an alternate router over a different path, such that the packet arrives at its original ultimate end location. That path from beginning to the end can be selected from among numerous alternatives. All packets in any particular message need not follow the same paths from beginning to end. The time ordering of packets from a particular source in a network to a selected destination of that network is generally sufficient, such that the efficiency of the end point receiving the packet is maintained.

A problem with present IP routers is that they lack built-in protection mechanisms.

Typically networks contain many routers that have single points of failure. The routers also presently do not scale to large number of ports. Today the largest router is in the order of 8 to 16 ports, which results in very limited configurations that can use these routers. Multiple small routers are built together to make larger configurations. This results in an exponential increase in the number of actual routers compared to the number of ports in the network. It also implies that the latency of data through the multiple stages of routers goes up.

The issue of unreliability or single points of failure in a single router implies that the network overall is less reliable. Any particular router that fails cannot itself contain the error, which must consequently ripple through the wider network. Protocols then must be used to find ultimate routes through the network. Service providers prefer that errors be contained within a small portion of a network, whether it is a link from a source to a destination or a router itself. In this way, a single individual error is contained in a very small portion of an overall network, thereby making the network manageable.

Synchronization of a large distributed system must be accomplished such that the various modules of the system can communicate, without creating any single points of failure. Telecom systems with SONET interfaces typically require clock synchronization such that all SONET interfaces within the entire network are traceable from highly accurate sources.

SUMMARY OF THE INVENTION

The present invention is directed to a system and method in which information and control are synchronized as they flow through a large distributed IP router system with independent clocks. The IP router includes multiple equipment racks and shelves, each containing multiple modules. The IP router is based on a passive switching device, which in some embodiments is an optical switching device. However, it is a passive switching device in which the control and the data that go to the switching device come from different sources, which have different clocks. What is described is a timing and synchronization mechanism, such that data and control both arrive at the switching device at the proper time.

The system sends fixed sized chunks of information through the optical switch. A chunk period (also known as a chunk frame period) is on the order of 330 ns in duration and consists of a "dark period" when the optical switches configuration is changed, and a "light period" when a chunk of data passes through the optical switch. The chunk data consists of 400 bytes of payload and roughly 50 bytes of overhead.

The mechanism described accomplishes two types of synchronization. First, the individual clocks for each module in the system are synchronized. Each module in the system is provided a synchronization signal from a centralized clock synchronization shelf. Each module also contains its own crystal clock source that is used if for any reason the clock synchronization distribution fails. The clock crystals on each module are specified to have +/–5 ppm (parts per million of frequency variation). In the event of a clock synchronization distribution failure, the individual crystals will have slight frequency differences.

The second type of synchronization required by the system is the propagation of chunk frame period from a centralized location through two different paths to the optical switches. One path is the configuration control for the optical switch and the other path is the chunk data being sent through the optical switch. The lengths of these interconnect paths can be variable over a range from roughly 5 meters to roughly 150 meters.

To accomplish these objectives, a single point in the system originates timing, which is then distributed through various ASICs of the system to deliver configuration control to the switch at the appropriate time. The launch of information to the switch is also controlled with a dynamic feedback loop from an optical switch controller. Control aspects of the optical switch are aligned by this same mechanism to deliver control and data to the optical switch simultaneously.

Various aspects of the invention are described in co-pending, and commonly assigned U.S. application Ser. No. 09/703,057, filed Oct. 31, 2000, entitled "System And Method For IP Router With an Optical Core," co-pending, and commonly assigned U.S. application Ser. No. 09/703,056, filed Oct. 31, 2000, entitled "System and Method for Router Central Arbitration," co-pending, and commonly assigned U.S. application Ser. No. 09/703,038, filed Oct. 31, 2000, entitled "System and Method for Router Data Aggregation and Delivery," co-pending, and commonly assigned U.S. application Ser. No. 09/703,027, filed Oct. 31, 2000, entitled "Router Network Protection Using Multiple Facility Interfaces," concurrently filed, co-pending, and commonly assigned U.S. application Ser. No. 09/703,043, filed Oct. 31, 2000, entitled "Router Line Card Protection Using One-for-N Redundancy" and co-pending, and commonly assigned U.S. application Ser. No. 09/703,064, filed Oct. 31, 2000, entitled "Router Switch Fabric Protection Using Forward Error Correction," the disclosures of which are incorporated herein by reference.

The foregoing has outlined rather broadly the features and technical advantages of the present invention in order that the detailed description of the invention that follows may be better understood. Additional features and advantages of the invention will be described hereinafter which form the subject of the claims of the invention. It should be appreciated by those skilled in the art that the conception and specific embodiment disclosed may be readily utilized as a basis for modifying or designing other structures for carrying out the same purposes of the present invention. It should also be realized by those skilled in the art that such equivalent constructions do not depart from the spirit and scope of the invention as set forth in the appended claims. The novel features which are believed to be characteristic of the invention, both as to its organization and method of operation, together with further objects and advantages will be better understood from the following description when considered in connection with the accompanying figures. It is to be expressly understood, however, that each of the figures is provided for the purpose of illustration and description only and is not intended as a definition of the limits of the present invention.

BRIEF DESCRIPTION OF THE DRAWING

For a more complete understanding of the present invention, reference is now made to the following descriptions taken in conjunction with the accompanying drawing, in which:

FIG. 4 is a block diagram showing the two central arbiter modules, namely active CAM 13 and standby CAM 15;

FIG. 5 is a timing diagram showing the timing relationships of the echo alignment timing mechanism described in connection with FIG. 4;

DETAILED DESCRIPTION

Figure 1:
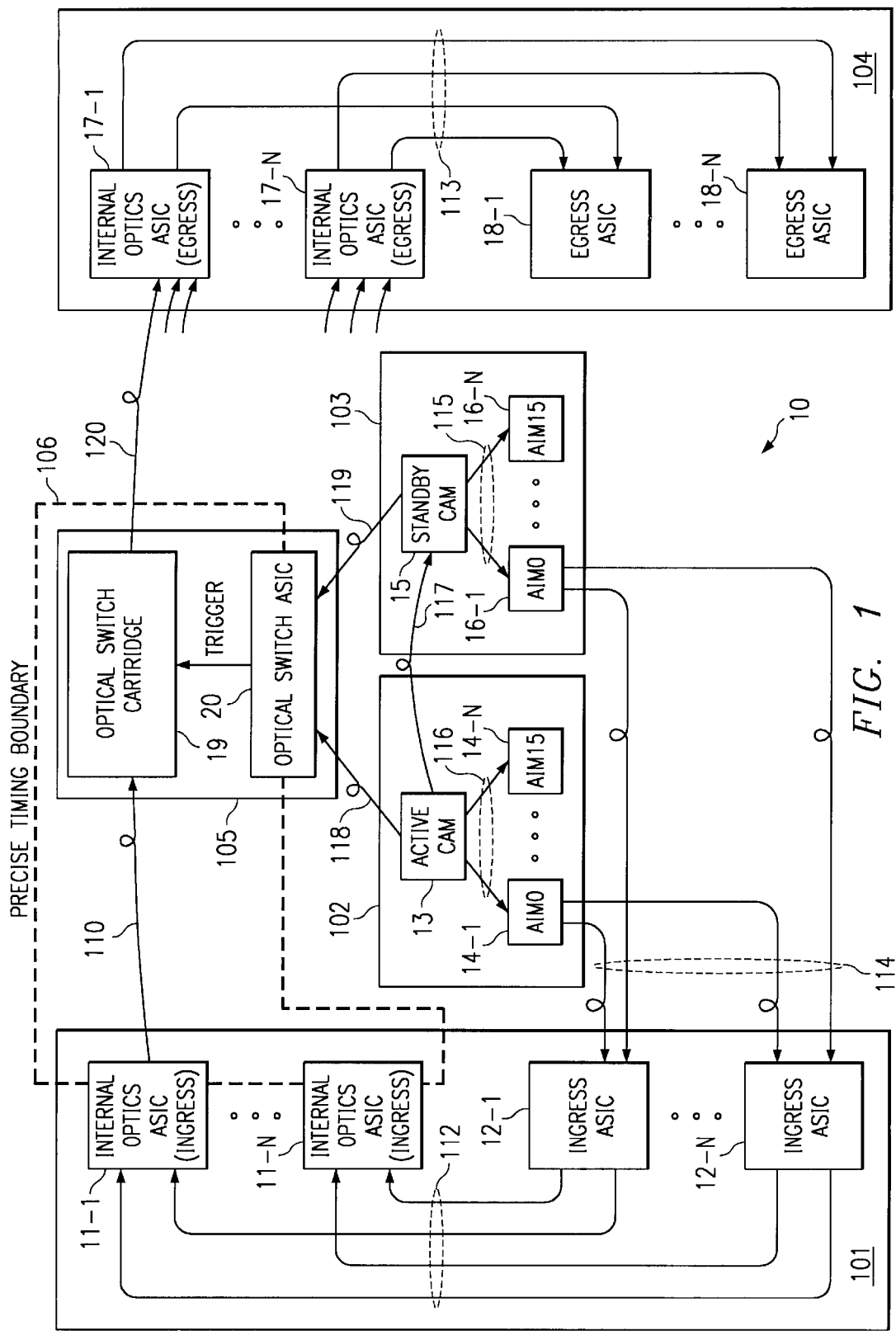
FIG. 1 is a simplified block diagram of a router, according to an embodiment of the present invention.

FIG. 1 is a simplified block diagram of a router 10, according to an embodiment of the present invention. Router 10 includes an ingress side line shelf 101 and an egress side line shelf 104. In some embodiments, ingress and egress line shelves 101 and 104 are a single unit, but in FIG. 1 they are illustrated for clarity as separate units. A router also includes a switching fabric. A fabric is a collection of devices which cooperatively provide a general routing capability. One example of a switching fabric is a centralized crossbar. Router 10 includes an optical switch 19 configured as a crossbar. Router 10 further includes arbiter (ARB) shelves 102 and 103 and an optical switch shelf 105. A typical system includes four optical switch shelves 105, two ARB shelves 102 and 103, and up to 64 line shelves 101, 104 in combination. One skilled in the art could vary these combinations, which are used strictly to illustrate the essential elements of the invention.

Within ARB shelf 102 is contained a central arbiter module (CAM) 13 which is designated the active CAM. Active CAM 13 is the central point of arbitration which passes information both to optical switch shelf 105 through a link 118 and to an arbiter interface module (AIM) 14-1 through 14-N through links 116. Active CAM 13 determines for each switch cycle the configuration of each optical switch cartridge 19 in shelf 105. There is only one active central arbiter module for the entire router.

Within router 10 there are two concepts of a cycle: a clock cycle and a chunk period. A chunk is defined as a uniformly sized piece of information that is passed through optical switch cartridge 19 during one cycle of the switch. All information moves through optical switch cartridge 19 in chunks. A chunk is a fixed sized quantity of information, which in this particular embodiment is 330 nanoseconds long. An actual chunk contains 400 bytes of payload information and on the order of 50 bytes of overhead, for example headers and trailers. After a chunk passes through optical switch cartridge 19, then before another chunk can pass through, the configuration of optical switch cartridge 19 is typically changed.

In each optical switch cycle there is a segment of time during which chunks of information go through optical switch cartridge 19 and another segment of time during which the optical switch cartridge 19 is reconfigured for a next chunk. These two segments of a switch cycle, termed respectively "dark period" during which optical switch cartridge 19 is reconfigured and essentially no information passes through it and the "light period" during which information passes through the optical switch, are together termed a "chunk period".

Active CAM 13 determines the configuration for the optical switch and must do so for every chunk period. Active CAM 13 receives request information when packets arrive in the router. Eventually, the requests make their way to active CAM 13. Active CAM 13 then analyzes all the requests from the various input sources and passes configuration information for a chunk period through links 118 to an optical switch ASIC 20 in optical switch shelf 105. Active CAM 13 also passes grants through links 116 to AIM modules 14-1 through 14-N. AIM modules 14-1 through 14-N then pass that grant information back to ingress ASICs 12-1 through 12-N through fiber optic links 114. Ingress ASICs 12-1 though 12-N receive the grant and create the actual information payload that is in a chunk. That information payload is then passed to internal optics ASIC 11-1 through 11-N. The internal optics ASICs 12-1 through 12-N take the information payloads, append Forward Error Correction (FEC) information and encapsulate them into chunks.

Forward Error Correction is used to correct any bit errors incurred through the optical switch at the egress internal optics ASIC 17-1 through 17-N. In this fashion chunks of information from the ingress internal optics ASICs 11-1 through 11-N pass through a fiber optic link 110 and subsequently through optical switch cartridge 19. The chunks then pass through links 120 to egress internal optics ASIC 17-1 through 17-N.

Egress internal optics ASIC 17-1 through 17-N receive the chunk information and use the FEC information to correct any bit errors that occurred in the chunk. Once that correction is complete, egress internal optics ASICs 17-1 through 17-N pass the chunk information to egress ASICs 18-1 through 18-N, from which the information is then passed out to the destination ports of Router 10.

A standby CAM 15 in standby ARB shelf 103 provides additional fault tolerance. In the event of any failure in active CAM 13, standby CAM 15 is available to continue making decisions on configuration information for the optical switch on a chunk-by-chunk basis. In standby ARB shelf 103, are also standby AIM modules 16-1 through 16-N. Similar to links 116, links 115 communicate from standby CAM 15 to AIM modules 16-1 through 16-N, and links 114 pass the standby grant information from standby AIM modules 16-1 through 16-N to ingress ASIC 12-1 through 12-N.

Accordingly, ingress ASICs 12-1 through 12-N receive a grant from AIM modules 14-1 through 14-N or 16-1 through 16-N and build the chunk information that is passed on to internal optics ASICs 11-1 through 11-N. The information used to build chunks is provided by the packets arriving from the input interface of Router 10 and are then queued up in ingress ASICs 12-1 through 12-N. Ingress ASICs 12-1 through 12-N make requests to AIM modules 14-1 through 14-N and 16-1 through 16-N that are passed on to active CAM 13 and standby CAM 15. Those requests are for chunks of information to go through optical switch cartridge 19. Active CAM 13 and standby CAM 15 make the decision which requests to honor, and the resulting configuration control is passed to optical switch cartridge 19 through links 118 and 119. At the same time, grants based on that decision are passed back to AIMs 14-1 through 14-N and 16-1 through 16-N, and then on to ingress ASICs 12-1 through 12-N through links 114. Ingress ASICs 12-1 through 12-N receive a grant and then access chunk building instructions associated with the grant out of a queue. The chunk building instructions specify which packets to assemble into a uniform sized chunk payload containing 400 bytes of information. Ingress ASICs 12-1 through 12-N send those chunk payloads on to internal optics ASICs 11-1 through 11-N to be sent through optical switch 19.

Active CAM 13 distributes timing through the rest of router system 10, with the objective to get the switch configuration control information to optical switch 19 concurrently with the arrival of a corresponding data chunk that is built at ingress ASICs 12-1 through 12-N and passed through internal optics ASICs 11-1 through 11-N. The control information and the corresponding data chunk have to arrive simultaneously at optical switch 19. Alignment is very critical, in that there is a particular time window within which chunks of information must arrive at optical switch 19 in order to pass through the switch. If the arrival of a chunk is too early or too late relative to reconfiguration of the optical switch, then the chunk will be truncated based on the new optical switch configuration. Accordingly, the chunk data must be aligned through the switch during a "light period" and in between the "dark periods" when the switch is being reconfigured. In the present example, the chunk period is roughly 330 nanoseconds, consisting of chunk information roughly 280 nanoseconds long and a dark period 50 nanoseconds long. Of the 50-nanosecond dark period, it actually requires roughly 40 nanoseconds to reconfigure the switch, leaving approximately a 5-nanosecond margin at either side of the dark period for aligning the chunk information with that time window properly, in order not to truncate the chunk information as it goes through the optical switch.

The optical switch has, in the current implementation, 64 inputs that each go to any of 64 outputs. At any given chunk period, any of the 64 inputs can be connected to any of the 64 outputs, with one-to-one mapping between inputs and outputs as the only restriction. There are no other restrictions on mapping of input to output at any chunk period. Thus, the current optical switch is a complete crossbar. The configuration information tells optical switch ASIC 20 how to configure the switch inputs and outputs in a given chunk period.

Referring to the previously described operation, packets that come into router 10 at the source of the router go to ingress ASICs 12-1 through 12-N, which send requests to CAM 13, 15 and receive grants that come back from active CAM 13. Ingress ASICs 12-1 through 12-N build information chunk payloads, which have a specific destination within the router in order to go out of the router on a particular output port. Configuration information that is sent out from active CAM 13 to optical switch cartridge 19 tells how to configure the inputs to the outputs of optical switch cartridge 19, such that packets overall are switched from the desired input to the desired output of router 10.

Packets come in through the input of router 10, having packet sizes in a range from approximately 40 bytes up to approximately 9600-byte "jumbo" packets. At ingress ASICs 12-1 through 12-N those packets are queued up, requests are made to CAM 13, and grants come back. Ingress ASICs 12-1 through 12-N upon receiving a grant will extract out of its queue or multiple queues enough packet information all heading to the same destination to fill up a single chunk. Multiple small packets totaling 400 bytes that are all headed from one ingress ASIC to a common destination within router 10 can be assembled into one chunk. Therefore several IP packets can be accumulated and assembled to form a single chunk, which for the purpose of moving through router 10 functions as a single data unit, but is subsequently broken down into its original component packets before being delivered to a router output port.

Conversely, a large packet exceeding one chunk in size is segmented into segments of approximately 400 bytes and inserted into multiple chunks. Each segment is roughly 400 bytes. Chunks exist only while traveling within the router from the ingress side to the egress side. Once at the egress side, a chunk that contains multiple small packets is decomposed into its original packets, and chunks that contain segments of a larger packet are accumulated and then reassembled into the original larger packet. The information is then sent out of router 10 in the form of the original packets.

Thus, requests that are issued from the ingress ASIC 12-1 through 12-N are passed to an arbiter interface module (AIM). The AIM passes those requests up to the central arbiter module, which receives requests from all the input requesting sources and on every chunk period examines all the outstanding requests and decides which request to honor to configure the switch for that particular chunk period. Active CAM 13 then sends configuration information to the optical switch, so that the switch can be configured to honor that request. It also sends a grant back through the AIM modules to ingress ASICs 12-1 through 12-N. Those grants, associated with the requests that were previously made, instruct ingress ASICs 12-1 through 12-N which configuration the optical switch will be on a future chunk period, so that the ingress ASICs can form chunks to send through the optical switch.

The arrows in FIG. 1 show the paths that are used to distribute timing information throughout router system 10. Not shown for simplicity in FIG. 1 are the request paths that go from ingress ASICs 12-1 through 12-N to AIM modules 14-1 through 14-N and then on to active CAM 13. CAM 13 grants requests a number of chunk cycles in advance (typically six chunk periods) of when the optical switch is actually needed in a given configuration. Using a pipeline process, it takes approximately six chunk periods for configuration information to actually make its way to optical switch cartridge 19 and also roughly six chunk periods for the grants to make their way back to ingress ASIC 12-1 through 12-N, to build the chunk, and to forward the chunk to the optical switch. Accordingly, the data path from active Cam 13 through the ingress and internal optics ASICs to the optical switch is roughly six chunk periods long, as is the path of configuration information from active CAM 13 through optical switch ASIC 20 to optical switch cartridge 19.

In some embodiments (see U.S. application Ser. No. 09/703,057, cited above), ingress ASICs 12-1 through 12-N and egress ASICs 18-1 through 18-N are each contained in a packet forwarding module. Each packet forwarding module in turn is interconnected with router input and/or output ports through facility interfaces. In some embodiments each packet forwarding module receives and/or sends duplicate input data packets in parallel through paired redundant facility interfaces. A group of N packet forwarding modules are interconnected into a protection group configured for one-for-N protection, having one protect packet forwarding module for N working packet forwarding modules, where N is a positive integer greater than two, typically 4.

In FIG. 1, paths or links that are contained within a respective shelf 101 through 105 are electrical in nature. They are contained within a given shelf, such that a path distance is a relatively short fixed distance between modules on a backplane. On the other hand, paths that go between shelves 101–105 are fiberoptic links, which are variable in distance and thus in propagation delay, depending on locations of various racks and shelves within overall router system 10. The timing distribution mechanism must deal with those variable lengths, such that the data and the configuration control still reach the optical switch cartridge simultaneously.

Figure 2:
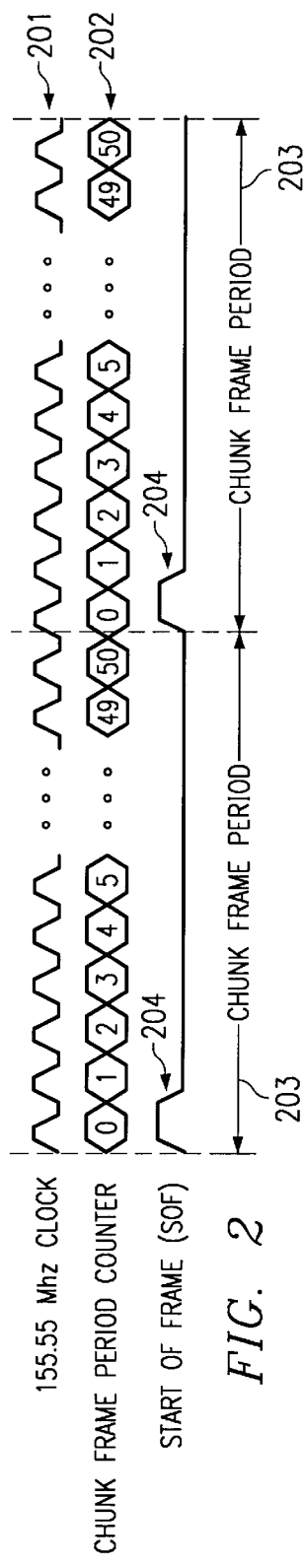
FIG. 2 is a timing diagram illustrating the definition of a chunk frame.

FIG. 2 is a timing diagram illustrating the definition of a chunk frame. As described above, timing in router system 10 is measured by chunk periods, such that a chunk period is roughly 330 nanoseconds. A chunk period is further composed of multiple clock periods. FIG. 2 depicts clock waveform 201 composed of multiple 155.55 MHz clock cycles. In the present example, 51 of the 155.55 MHz clock cycles are included in a single chunk frame period 203 as illustrated by a chunk frame period counter 202. Chunk frame 203 consists of multiple clock periods worth of work to be performed. The work can be data or control, which must be transferred across an interface within a single chunk period of time, or the work can be an operation, which must be performed within an ASIC during a single chunk period of time. Since a chunk period can be 50, 51, or 52 clock periods in duration when a clock synchronization distribution failure has occurred, the work to be performed must be able to be completed within the shortest of these durations, namely 50 clock periods. The extra one or two clock periods cannot be relied upon to perform required work. A start of frame (SOF) indicator 204 is used by an ASIC to indicate when the first cycle of a new chunk frame period begins.

Each of the modules of router system 10, as described above in connection with FIG. 1, has an independent clock source, typically a crystal oscillator. If there is a failure within the clock distribution system, then each module operates according to its own clock source. Consequently, each of these modules has to understand what a chunk frame period is, and they all have to recognize it as the same chunk period. However, because a given module has an independent clock source, which by design is very close to the master clock source frequency, it can vary by as much as 5 ppm, based on the specified accuracy of the crystal oscillators.

Active CAM 13 is the module that specifies that a chunk frame period is 51.00 clock periods in duration. If another module is operating on its independent timing crystal that is off by as much as 5 ppm, then for that particular module a chunk frame period would average from 50.999745 to 51.000245 of its clock periods, whereas the same chunk frame period would be 51.00 clock periods according to the active CAM. When the system distributes timing information, all modules must agree on the same chunk period, even if it is measured by slightly different numbers of clock periods for different modules. The active CAM counts exactly 51.00 of its clock periods to define what the chunk frame period is. Whatever its clock frequency is, whether it is the one that is off by 5 parts per million or is the one that is exactly accurate, 51.00 active CAM clock periods always define the chunk frame period. On all other modules the chunk frame period will also be 51.00 clock periods in duration, provided the clock synchronization distribution is working properly. When clock synchronization distribution fails to one or more modules, then the affected modules normally have 51.00 clock periods per chunk frame period, but will occasionally have 50 or 52 clock periods per chunk frame period. The occasional one more or one less clock period per chunk frame period compensates for the slightly faster or slower clock frequency of the local unsynchronized crystal oscillator source.

Figure 3:
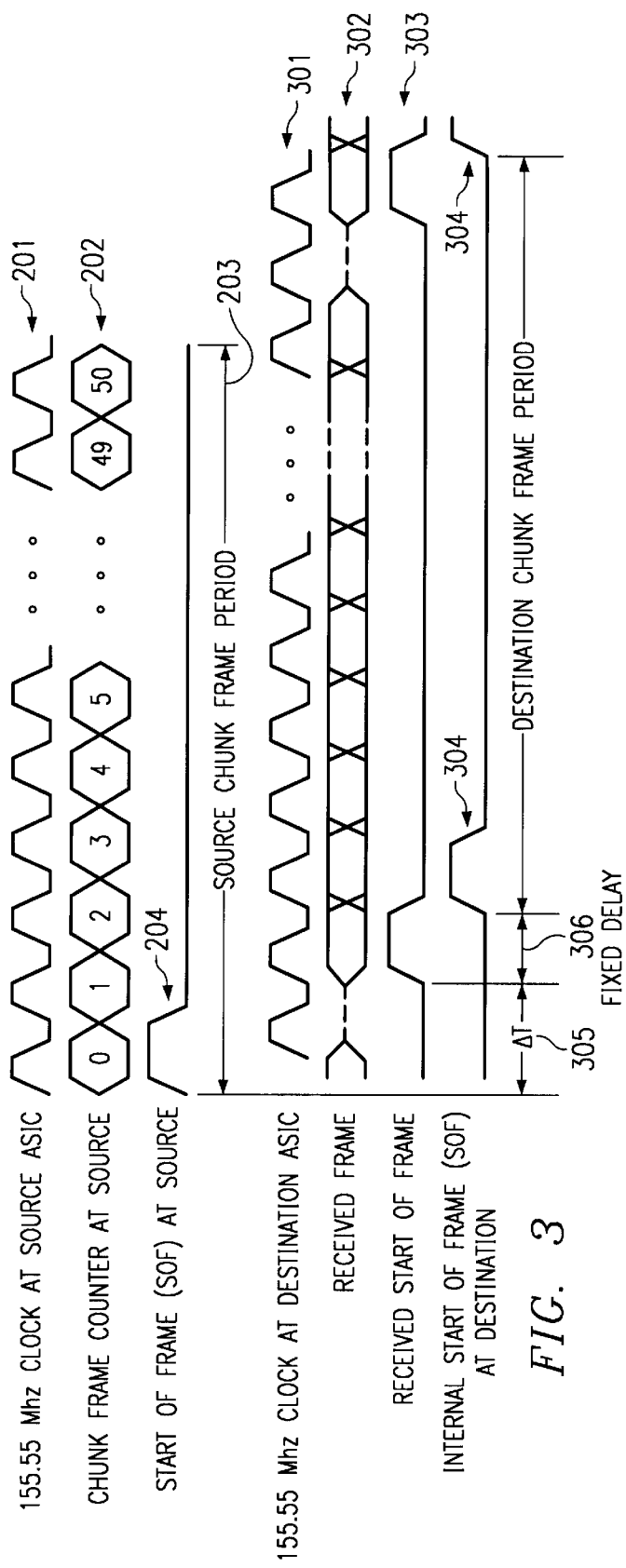
FIG. 3 is a timing diagram showing how start of frame propagates from an active CAM to an AIM module.

FIG. 3 is a timing diagram showing how start of frame propagates from active CAM 13 to AIM modules 14-1 through 14-N within ARB shelf 102 of FIG. 1. FIG. 3 shows how the waveforms appear at the source and destination of links 116 of FIG. 1. Waveforms 201, 202, 203, and 204 are the same as in FIG. 2 and depict the respective clock waveform, chunk frame counter, chunk frame period, and start of frame indicator at the source end of link 116. Waveforms 301, 302, 303 are counterpart waveforms at the destination end of link 116. Waveform 301 represents the actual clock waveform on the destination AIM module 14-1 through 14-N of link 116 having a delay relative to clock waveform 201 and showing that the clocks are not coincident, typically due to propagation delay of information 201, 203 from the source of the link to the information 301, 302 at the destination of the link. Waveform 303 shows a start-of-frame indicator at the destination of the link. Based on the reception of that information, the destination AIM module decodes out of the information a local start-of-frame 304.

Start-of-frame 304 shows a destination chunk frame period, in contrast to source chunk frame period 203. Delay ΔT 305 is a difference between source chunk frame period start 204 and the time when the start of frame 303 is received by the destination ASIC. The destination ASIC receives a start of frame having length dependent delay ΔT 305 due to propagation delay, and it will delay that further by some small delay 306 on the order of 2 to 3 clock periods, until it starts the destination ASIC internal chunk frame period. The 2 or 3 clock periods insure that variations in the time that start of frame is received are tolerated, such that a constant destination internal start of frame occurs. If the two clock sources of active CAM 13 and AIM 14-1 through 14-N are actually on slightly different clocking periods, then the information that comes in changes (precesses) relative to the clock of the destination ASIC. This precessing can be hidden within the fixed delay period, such that the destination ASIC constantly issues its start of frame and only adjusts it occasionally to maintain a constant start of frame delay 306. This adjustment causes the destination chunk period to occasionally be 50 or 52 clock cycles in duration.

Delta delay ΔT 305 is dependent upon the length of the link that connects from the source ASIC to the destination ASIC. Within the system, these are electrical links within a back plane. The variation between one link and another should be no longer than a propagation delay through some portion of the back plane on the order of 5 nanoseconds. These small delay variations can be tolerated just as component variations must be tolerated. Within the present system are links that are variable in length, typically due to distance variation in optical links between the various shelves. Since the distance variation can be anywhere from roughly 5 meters up to roughly 150 meters, equivalent to roughly 25 nanoseconds up to 750 nanoseconds, it is too large to be ignored and must be dealt with in some other manner. What is done is to tune that delay so that, independent of length variations, the destination will see that the delay is always the largest possible. In a short length of 5 meters, for example, sufficient delay is added before sending a start of frame through the link to accommodate the much larger fixed delay to the destination. An echoing technique is applied, as described below in more detail, to determine the actual length of a fiber, such that the total of initial delay plus fiber propagation delay equals a maximum fixed delay.

FIG. 4 is a block diagram showing the two central arbiter modules, namely active CAM 13 and standby CAM 15, previously shown in FIG. 1 in shelves 102 and 103 respectively. FIG. 4 illustrates the distribution of timing that occurs between active CAM 13 and standby CAM 15. Start of frames are propagated from active to standby CAM and are adjusted, such that the start of frames on both of those modules coincide in time as closely as possible. The implication is that the delay between active CAM 13 and the standby CAM 15 is then precisely one chunk period. Fiber 117 interconnecting active CAM 102 with standby CAM 103 consists of two links, one from active CAM to standby CAM, and one from standby CAM to active CAM It is desirable to maintain the timing relationship of start of frames on these two modules as closely as possible.

Chunk frame period counter 410 sets the chunk frame period, which is distributed from active central arbiter ASIC 13. Chunk frame period counter 410 counts up with an assumption of 51 clock periods in a chunk frame period and generates a start of frame indicator. This start of frame indicator is then delayed by the proper amount using a tuning mechanism that will be described below in more detail in connection with FIG. 5. The delayed start of frame is transmitted out through transmitter 401, received by receiver 404, and then detected again at start of frame detect logic block 420 on standby central arbiter ASIC 15, such that the output of chunk frame period counter 410 and the output of start of frame detect 420 coincide. Through the entire path from the output of chunk frame period counter 410 to the output of start of frame detect ASIC 420, the start of frame is actually delayed by precisely one full chunk frame period. From chunk frame period counter 410, the start of frame indicator goes to a training state machine 414, which is used in the echoing mechanism at the source central arbiter ASIC 13. Once standby central arbiter ASIC 15 receives the start of frame through receiver 404, it sends the start of frame back to source ASIC 13 through a transmitter 403 and through fiber link 117 to a receiver 402, and then back to start of frame detect module 413.

The start of frame outputs from chunk frame counter 410 and from SOF detect module 413 are then compared using training state machine 414. The relative delay should be exactly twice the one way propagation delay, namely one propagation delay traveling to the destination and a second propagation delay returning. Since optical link 117 has equal lengths and thus equal delays in each direction, then the one-way delay to the destination is one-half of the total delay. Accordingly, training state machine 414 determines the one-way delay to the destination. It knows the total chunk period, subtracts half of the round trip delay, and applies the difference to the start of frame delay at delay module 412.

A master chunk counter 411 is used to indicate the beginning of a multi-chunk period. There are multiple chunk periods of delay between the time when active CAM 13 makes configuration decisions and the time when those decisions are applied to the chunk data and to the optical switch. An equal integral number of chunk periods must elapse for both configuration control and chunk data going to optical switch cartridge 19. Master chunk counter 411 is used to verify that the same integral number of chunk periods are present for the chunk data as for the configuration information at optical switch cartridge 19. In the present implementation, there are six chunk periods between active CAM 13 and optical switch cartridge 19 in both control and data paths. A time interval 16 chunk periods in duration is termed a master chunk period. Every 16th chunk period is designated as a master chunk. At that point the times are compared when master chunk control information arrived at optical switch cartridge 19 relative to data information to verify that they are properly phased. This is used as a cross check, and if control and data are out of synchronization, then adjustments are made at the source internal optics ASIC 11-1 through 11-N.

FIG. 5 is a timing diagram showing the timing relationships of the echo alignment timing mechanism described previously in connection with FIG. 4. FIG. 5 is separated into an Original Echo Response before delay is inserted and an Adjusted Echo Response after delay is inserted. For reference, chunk frame period 203 is shown, as described previously in connection with FIG. 2. Active CAM start of frame (SOF) 501 occurs concurrently with the start of chunk frame period 203. The standby CAM SOF 502 is delayed from active CAM SOF 501 by the combined delay of transmitter 401, fiber link 117, and receiver 404. Active CAM SOF echo 503 is standby CAM SOF 502 delayed by transmitter 403, fiber link 117, and receiver 402. A desired echo arrival would occur exactly one chunk frame period later than active CAM start of frame (SOF) 501. The object is to delay standby CAM start of frame 502 until it aligns with the desired arrival delay, indicated in FIG. 5 by a vertical line. The required delay is one half of the round trip delay, which is determined and subtracted from chunk frame period 203 to obtain an adjustment delay that is loaded into delay module 412 of FIG. 4, such that $$\text{Adjustment Delay} = \text{Desired Arrival Delay} - \frac{EchoArrivalDelay}{2}$$

In the portion of FIG. 5 labeled adjusted echo response is shown the original chunk frame period 203. Delayed start of frame 504 has been delayed by an adjustment delay. Delayed SOF 504 is then sent through transmitter 401, received by receiver 404, and then passed to start of frame detect module 420 of standby CAM module 103 of FIG. 4. Start of frame detect module 420 generates a standby CAM start of frame 505, which aligns precisely with original start of frame 204, delayed by exactly one chunk frame period. The actual alignment will not be exact due to differences in propagation delay of the transmitters 401 and 403, fiber links 117, and receivers 402 and 404. Additionally, misalignment will occur due to clock period phase differences between the clocks on active CAM 102 and standby CAM 103. An echo waveform 506 returned from active CAM ASIC 13 is slightly delayed from standby CAM SOF 505, due to the return path through transmitter 403, fiber link 117, and receiver 402. The foregoing steps minimize the delay between original chunk frame period 203 and desired arrival of standby CAM start of frame 507.

Referring again to FIG. 1, the echo mechanism between AIM Module 14-1 and ingress ASIC 12-1 is described below. Links 114 have variable lengths depending upon the distance between the actual racks in a telecom central office environment. A start of frame arrives at all ingress ASICs 12-1 through 12-N within the entire system at roughly the same time. Since optical links 114 have varying lengths, an echoing technique similar to that described in connection with FIG. 5 is used on these links, such that the echo arrival times at ingress ASICs 12-1 through 12-N are synchronized. Here a delay is applied at AIM module 14-1 before the frame information is sent through links 114. Initially, the delays are set to zero. The round trip delay of links 114 determine the actual timing of the link, so the actual delay of the link is one-half of the round trip delay.

The maximum optical cable length is roughly 150 meters, corresponding to a propagation time of roughly 750 nanoseconds. Half of the round trip delay is subtracted from 750 nanoseconds to compute the actual delay to be applied at AIM module 14-1 before the information frame is sent out across links 114. This aligns the start of frame for all information arriving at the ingress ASICs within plus or minus a small delay on the order of 10 nanoseconds. Thereby the SOF indicators have propagated from active CAM 13 to AIM 14-1 through 14-N to ingress ASICs 12-1 through 12-N to arrive within a time window of plus or minus 25 nanoseconds.

Ingress ASICs 12-1 through 12-N are each configured to choose one or the other of the two fiber links 114 that connect with respective CAM shelves 102, 103. Normally an ingress ASIC selects active CAM 13 and ignores standby CAM 15, so that it responds to only one of the received start of frame indicators. It receives from active CAM 13 the grant information for that particular chunk frame period and builds a chunk of information from the queued packet information associated with the grant. Multiple chunk periods of time within an ingress ASIC are typically required to build a chunk of information. A start of frame initiates the chunk building process, and that start of frame is then passed through ingress ASIC 12-1 through 12-N and eventually emerges at the output side of ingress ASIC 12-1 through 12-N across electrical interconnects 112 on a backplane. This propagation across the conductive back plane has been previously described in connection with FIG. 3. Ingress internal optics ASICs 11-1 through 11-N receive multiple start of frame indicators over interconnects 112 from ingress ASICs 12-1 through 12-N.

Figure 6:
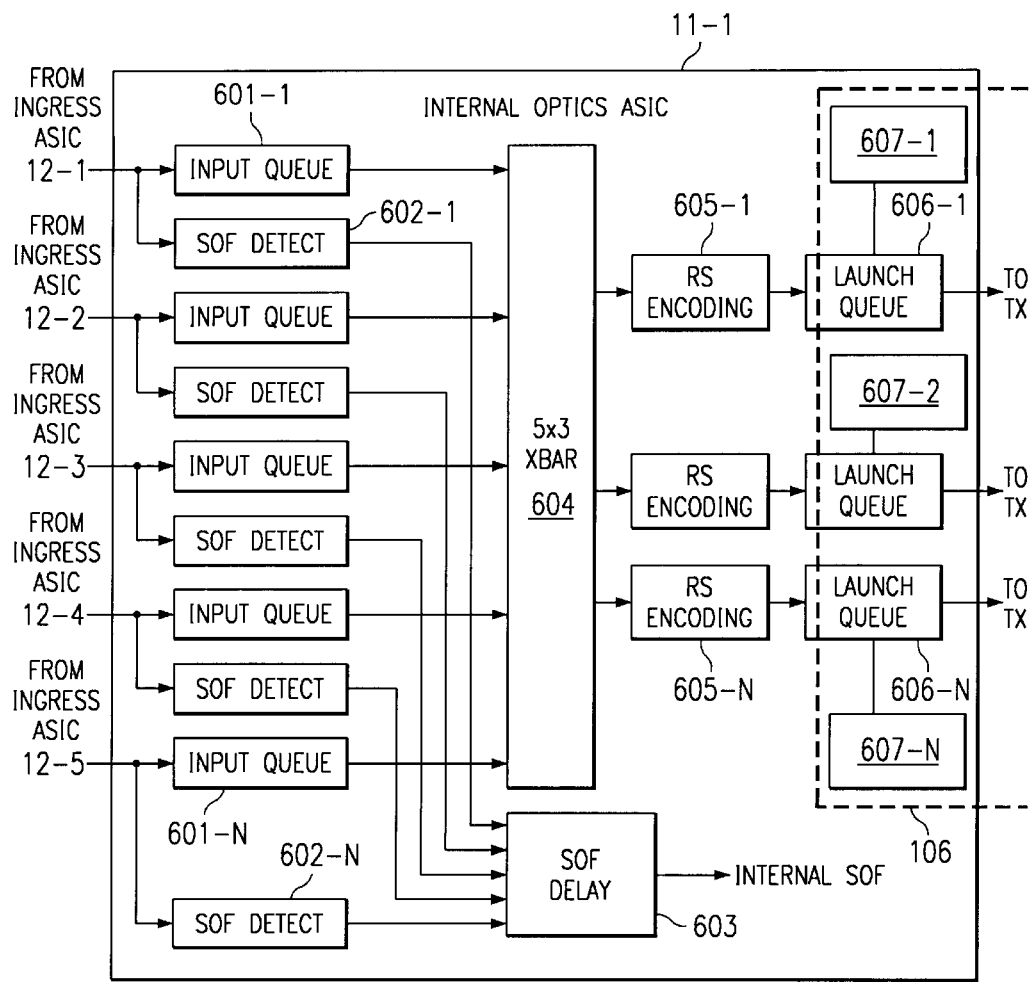
FIG. 6 is a schematic diagram of the structure of an internal optics ASIC.

FIG. 6 is a schematic diagram of the structure of internal optics ASIC 11-1. Multiple start of frame indicators arrive at internal optics ASIC 11-1 from ingress ASICs 12-1 through 12-N of FIG. 1. In FIG. 6, for example, 5 chunk frames arrive with start of frame occurring at slightly different times. For each received chunk frame the information frame is placed in input queues 601-1 through 601-N, and concurrently SOF detect blocks 602-1 through 602-N process the incoming information to determine when start of frame occurs. The start of frame of all 5 SOF detect blocks is then sent on to a SOF delay module 603 to generate an internal start of frame, that is used to extract information frames from input queues 601-1 through 601-N, enabling them all to pass simultaneously through a crossbar switch 604. With the 5×3 crossbar switch 604 shown in FIG. 6, only 3 of the 5 frames are passed through the crossbar itself. Then those 3 information frames pass through the Forward Error Correction (FEC) generation logic (Reed-Solomon encoder) 605-1 through 605-N labeled "RS Enc". At that point the FEC encoded information frames are passed on to launch queues 606-1 through 606-N, ready to be launched through optical switch cartridge 19 (See FIG. 1) at some time.

It is noted that crossbar switch 604 can be specified to provide other numbers of input and output terminals. Also, the type of forward error coding can be any type of coding, or alternatively the coding can be eliminated if desired for the system.

Figure 7:
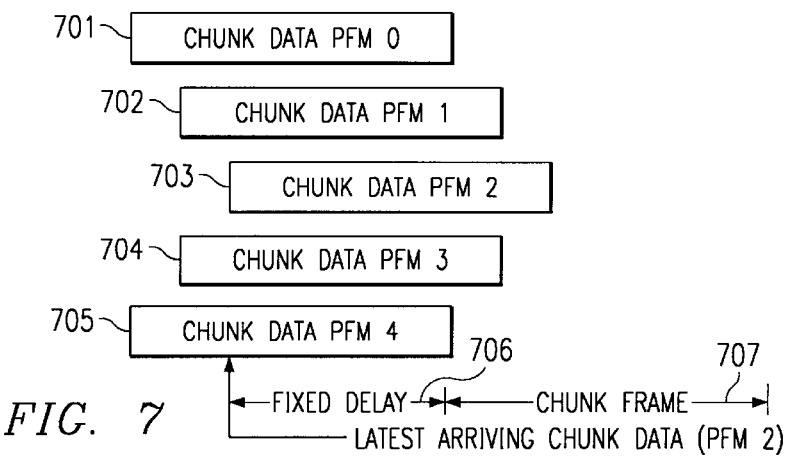
FIG. 7 is a timing diagram showing the internal optics ASIC chunk frame timing.

FIG. 7 is a timing diagram showing the internal optics ASIC chunk frame timing. The logic sequence of FIG. 7 is performed in SOF delay 603 of FIG. 6. Blocks 701, 702, 703, 704, and 705 represent five different chunks of information, each from a different ingress ASIC 12-1 through 12-N arriving at the inputs of FIG. 6. Illustratively, SOF delay 603 receives 5 start of frame indicators arriving from start of frame detect modules 602-1 through 602-N at different times within roughly 30 nanoseconds. Delayed start of frame must be initiated by SOF delay 603 after the last arriving input start of frame indicator from information frame 703. A fixed delay 706 after the arrival of chunk 703 is needed before initiating delayed start of frame internally. The delayed frame 707 extends for the normal chunk period of time after fixed delay 706.

Figure 8:
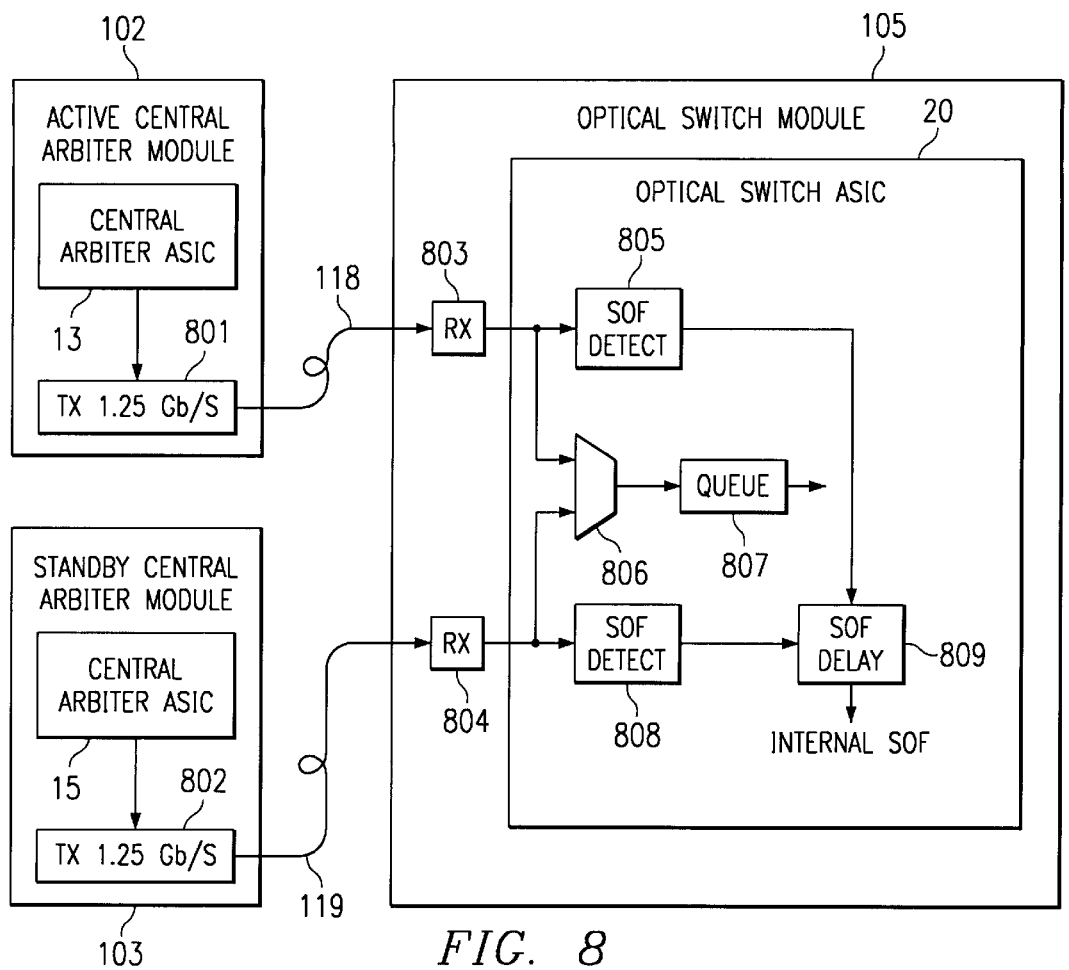
FIG. 8 is a block diagram showing the optical switch ASIC training of the start of frame at the input.

FIG. 8 is a block diagram showing the optical switch ASIC training of the start of frame at the input. Start of frame propagation from the active CAM through the AIM modules, the ingress ASICs, and into the internal optic ASICs has been described above. The propagation of the start of frame from active CAM to optical switch ASIC 20 is described in connection with FIG. 8. This is the control path that communicates configuration information to optical switch cartridge 19. Active CAM 102 and standby CAM 103 containing respectively central arbiter ASICs 13 and 15 each send out configuration information applicable to a chunk frame period through respective optical transmitters 801 and 802 and then through respective optical cables 118 and 119 to optical switch module 105. Optical cables 118 and 119 are allowed a small variation in length, typically on the order of at most 15 meters, equivalent to less than 75 nanoseconds of timing accommodation. CAM modules 102, 103 and optical switch module 105 are typically in a fixed configuration within a central office, resulting in only a relatively small length variation between optical cables 118, 119. This typically requires only tolerance to allow for the different optical cable lengths, but not a tuning operation. Configuration information is received by respective receivers 803 and 804 and forwarded to optical switch ASIC 20 in optical switch module 105. Each frame of information contains a start of frame indicator as well as the configuration information for a chunk period that must be applied to optical switch cartridge 19 (see FIG. 1).

Within optical switch ASIC 20 are start of frame detectors 805 and 808 on input paths through respective receivers 803 and 804. However, at any given time only one input is required for the configuration information. Selection is performed by a MUX 806, and the selected information is then loaded into a control queue 807, where it stays as long as is needed to match the delay of chunk data arriving through the data path to optical switch 19. Thereby data and control meet simultaneously at optical switch 19. The data is stored in launch queues 606-1 through 606-N on the data side, and control information is stored in control queue 807 on the control side.

A start of frame from SOF detect modules 805 and 808 of FIG. 8 is sent to a SOF delay 809. Again, that SOF is delayed for a short period of time to deal with tolerancing within optical switch ASIC 20. Start of frame delay 809 generates an internal start of frame indicator. That internal start of frame indicator is used by optical switch ASIC 20 to begin processing the corresponding chunk configuration data.

The foregoing timing distribution all occurs with a clocking granularity of a 155.55 megahertz clock rate. When the start of frame variation occurs between one chunk period and the next, due to possible delay variations of the fiber links or variations of an independent clock that is not synchronized with the others, the relative timing can move forward or backward by one cycle of the 155.55 megahertz clock. Thus the elapsed time from one chunk frame period to the next chunk frame period can actually be only 50 clock periods or 51 or 52. It can wander between 50, 51 and 52, if the target set by active CAM 13 for the chunk frame period is 51 clock periods. This represents a fairly coarse alignment of data arriving at the respective queues.

Referring again to FIG. 1, a precise timing boundary 106 is shown, within which the timing of data and control information to optical switch cartridge 19 is synchronized as precisely as possible. Any margin in the timing window of data and control adds directly to the overall chunk frame period. Accordingly, minimizing the margins directly improves the information fidelity and throughput of router system 10. The approach to synchronizing the timing involves periodically sending an administrative chunk of information from each internal optics ASIC 11-1 through 11-N in the system through optical switch cartridge 19. Optical switch ASIC 20 receives the administrative chunk, which carries information that allows it to be compared to a reference chunk that has already been received, to determine if it is aligned with that reference chunk.

Figure 9:
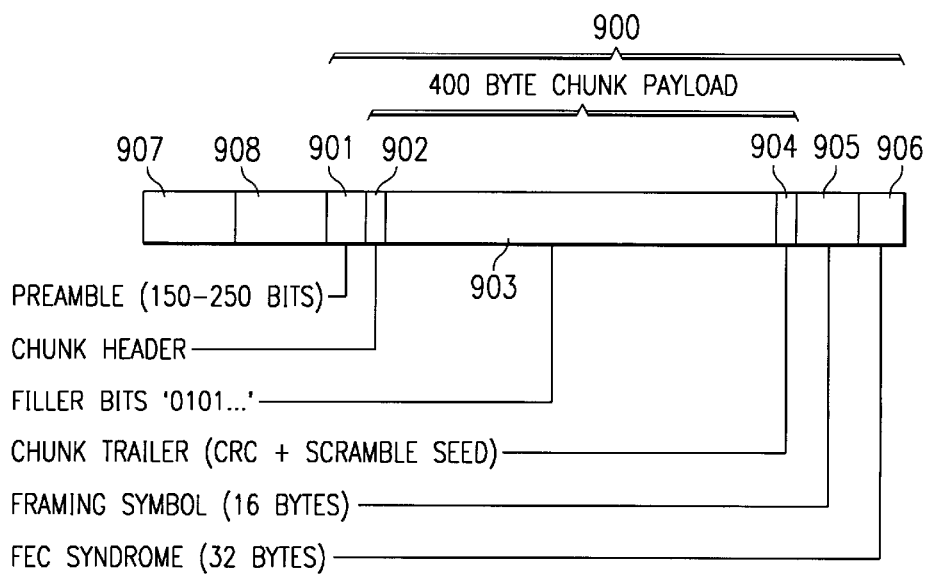
FIG. 9 is a schematic diagram illustrating the anatomy of an administrative chunk.

FIG. 9 is a schematic diagram illustrating the anatomy of a typical administrative chunk 900. Administrative chunk 900 contains a preamble 901 programmable in length, used to retrieve the clock and data of administrative chunk 900, consisting of a set of zero and one bits, thus enabling the remaining chunk data to be recovered properly. A chunk header 902 contains information identifying the source of the chunk, for example internal optics ASIC 11-1, and specifying that it is an administrative chunk, as well as other pieces of information that are not specific to timing. Filler bits field 903 contain another pattern of 0's and 1's. For an actual data chunk carrying IP (Internet protocol) information packets the filler field contains the payload of IP packet(s).

A chunk trailer 904 carries cyclically redundant information, enabling a cyclical redundancy check (CRC) of all prior information in the chunk payload to verify that it was received correctly. Chunk trailer 904 also contains a scrambling seed normally used to scramble the data payload of non-administrative chunks but set to zero to disable scrambling for administrative chunks. A framing symbol 905 is a very specific symbol placed near the end of administrative chunk 900 and non-administrative chunks to identify where within a stream of bits a chunk begins and ends. The framing symbol is not covered by the FEC, since the framing symbol must be located before the location of the FEC information can be known. The framing symbol is placed near the end of the chunk to increase the probability that the bits are properly recovered by a burst mode clock and data recovery mechanism. The framing symbol 905 is shown to be 16 bytes in length. Of the 16 bytes, only two bytes are located as shown in FIG. 9. The remaining 14 bytes are distributed through the last 56 bytes of the 400 byte chunk payload. These bytes are used to ensure that the framing symbol is unique within the window of bits that the receiving logic is searching to identify the framing symbol. The 14 bytes are distributed by placing two bits of framing symbol and 6 bits of chunk payload or filler into each of these last 56 bytes. The final field of administrative chunk 900 is a FEC Syndrome 906, which is used to detect and correct bit errors incurred in the chunk payload.

Two fields "Break Bytes" 907 and "Make Bytes" 908 respectively are located ahead of chunk preamble 901. The purpose of these fields is to precondition an optical receiver to a proper state before the actual chunk arrives at the receiver. The optical switch when changing configuration passes very little light through to the output fibers. During this period of time, designated the "dark period," the receivers receive no light and thus need to reestablish the decision threshold level of the limiting amplifier within the burst mode optical receiver. The threshold level is quickly reestablished by setting the value of the "Make Bytes" field 908 to all ones. "Make Bytes" field 908 is followed by preamble bytes 901, which are alternating ones and zeroes.

"Break Bytes" field 907 is configured to maintain a 50% density of 0's and 1's for the transmit laser. "Break Bytes" field 907 will have a higher density of zeros in order to balance the all ones in "Make Bytes" field 908. The "Break Bytes," "Make Bytes," and preamble fields are all programmable in length to allow flexibility. It is noted that the "Break Bytes" and "Make Bytes" fields can alternatively be located after the trailing end of the string of chunk fields in FIG. 9, since chunks are transmitted one after the other, end to end. Thus the "Break Bytes" and "Make Bytes" could correctly be placed before the preamble or after the trailing end of a chunk. Administrative and traffic-bearing chunks and their uses are further described in U.S. application Ser. No. 09/703,038, cited above.

The approach used to perform alignment of the chunk information through the optical switch cartridge is two-phased. The first phase is coarse adjustment to place the framing information of the chunk within the proper window of optical switch cartridge 19. Coarse adjustment is performed at machine turn-on or first source plug-in, telling the source to move the administrative chunk period forward in one clock period increments, until it appears within the timing window. In the present embodiment, data transmission through optical switch 19 occurs at 12.5 gigabits per second (Gb/s). In a system having a clock frequency of 195 megahertz, for example, roughly 64 of those 12.5 Gb/s bits are equivalent to one clock period or roughly 5 nanoseconds. Once a chunk frame appears within the time window, a fine adjustment maintains it within that window.

Figure 10:
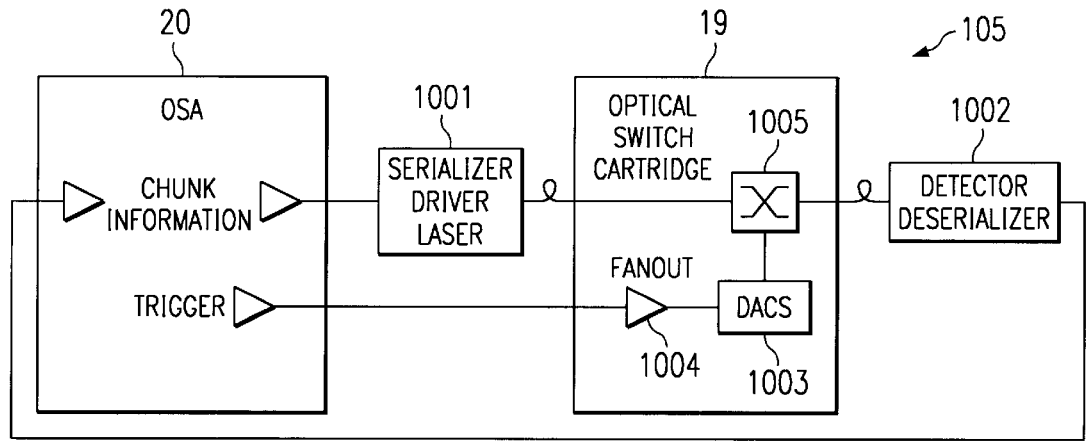
FIG. 10 is a simplified block diagram showing internal components of optical switch module.

FIG. 10 is a simplified block diagram showing internal components of optical switch module 105. Optical switch module 105 contains optical switch ASIC 20 and a transmitter function 1001 incorporating a serializer, driver, and laser, which performs the functions of taking a parallel output of optical switch ASIC 20, turning that into a serial bit stream at 12.5 Gb/s, sending that serial bitstream through the laser driver, and then to the laser itself to generate a 12.5 Gb/s stream of optical bits or photons that go through optical switch cartridge 19. Optical switch cartridge 19 contains an optical switch 1005 and DACs 1003, which are used to steer the light within optical cartridge 19. The output of optical switch 1005 is then put through a receiver function 1002 incorporating a detector and deserializer, where the detector detects the 12.5 gigabit/sec stream of optical information, which the deserializer converts one bit at a time into parallel data streams low enough in frequency to be received by optical switch ASIC 20.

FIG. 10 illustrates how to define the initial window in which to align all the other administrative chunks packets from internal optics ASICs 11-1 through 11-N. To accomplish this, optical switch ASIC 20 sends out an administrative chunk to itself through transmitter function 1001, through optical switch cartridge 19, receiver function 1002, and then back to optical switch ASIC 20. There is sufficient information in administrative chunk header 902, namely the source and the destination for that chunk, to determine that it was sent by optical switch ASIC 20 and is to be received by optical switch ASIC 20.

The configuration of optical switch 1005 allows the administrative chunk to pass through the switch back to its source. When optical switch ASIC 20 is first turned on, it does not know where to look for a framing symbol, even from itself. Thus optical switch ASIC 20 repetitively sends the administrative chunk to itself, while optical switch ASIC 20 increments the timing window forward, for example in roughly 5-nanosecond steps, until it recognizes the framing symbol of its own administrative chunk. Once there, a fine adjustment procedure maintains the timing window properly centered around the optical switch ASIC 20 administrative chunk framing symbol 905. From that point in time, optical switch ASIC 20 knows from its own internally generated reference administrative chunk where to position the timing window. Optical switch ASIC 20 then compares all other administrative chunks that arrive, for example the internal optics ASIC 11-1 administrative chunk, with its own chunk that it generated itself, to align the framing symbols of all other chunks with its own framing symbol. Thus it has an internal reference counter from the point in time when it receives its own administrative chunk, and it compares that to the count when it receives administrative chunks from all other sources. Optical switch ASIC 20 subtracts those two counts to determine the offset of other administrative chunks relative to its own administrative chunk. Thus, it now has a "delta" as a fine tuning adjustment, that is passed back to the source of other administrative chunks to adjust future launches of all chunks, administrative and non-administrative.

Figure 11:
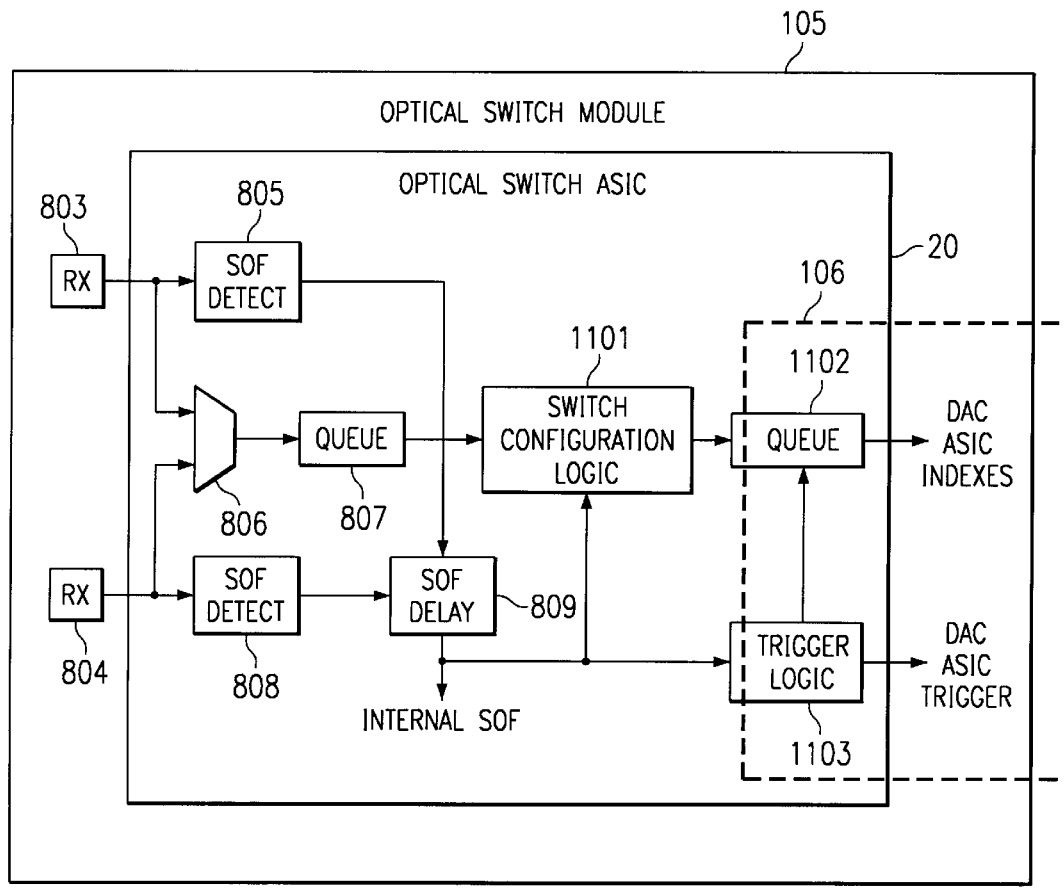
FIG. 11 is a block diagram showing an optical switch ASIC in more detail.

FIG. 11 is a block diagram showing optical switch ASIC 20 in more detail. FIG. 11 includes components previously shown in FIG. 8, such as start of frame delay 809, which generates an internal start of frame indicator. This internal start of frame can have a jitter from one chunk frame period to the next chunk frame period of roughly one of the previously described 155-megahertz clock periods, on the order of 6.5 nanoseconds of jitter, which is excessive jitter within precise timing boundary 106. A start of frame indicator is sent to a trigger logic 1103 to reduce jitter of the internal start of frame. Whereas trigger logic 1103 can receive inputs changing rather quickly, this input jitter is smoothed by trigger logic 1103, such that the output jitter is reduced to roughly 5 parts per million.

To accomplish this, trigger logic 1103 operates at a higher clock rate than does SOF delay 809. The trigger signal itself typically has a resolution of 1.28 nsec, which is 16 of the 12.5 gigabit per second clock periods. This resolution allows the edge of the trigger signal to be adjusted as finely as 1.28 nsec on the order of every 750 chunk frames in order to provide a 5 ppm adjustment rate. The trigger signal prompts DACs 1003 when to change their value to reconfigure optical switch 1005.

Internal start of frame generated by SOF delay 809 is used by switch configuration logic 1101 to initiate extraction of switch configuration information from queue 807. Switch configuration logic 1101 performs a virtual to physical mapping of the individual switch ports of optical switch 19. This provides flexibility in assigning optical fiber connections to input and output port assignments. Once the mapping is completed, the actual switch configuration information is placed in output queue 1102.

Shortly after trigger logic 1103 sends a trigger to the DACs ASIC, the next switch configuration information is extracted from queue 1102 and preloaded into DACs 1003, so that it is already there and stable before the next trigger occurs. The configuration information remains in queue 1102 for a predetermined period of time that in turn controls the period of time that data chunks stay in launch queues 606-1 through 606-N (see FIG. 6), to align with the trigger logic.

Figure 12:
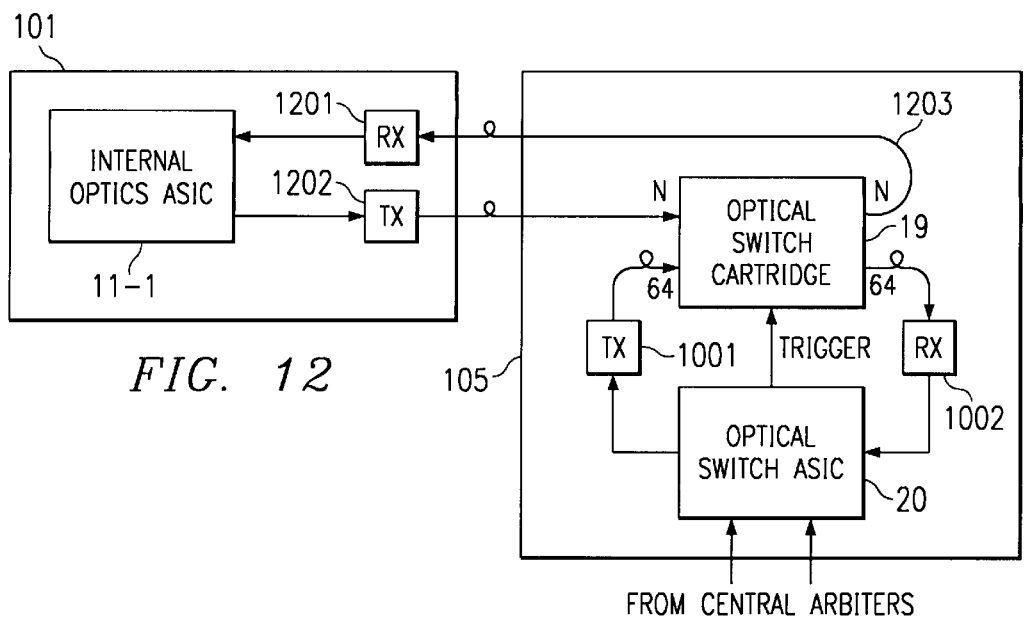
FIG. 12 is a block diagram illustrating the launch delay adjustment that is applied, for example, to internal optics ASICs, as described previously in connection with FIG. 6.

FIG. 12 is a block diagram illustrating the launch delay adjustment that is applied, for example, to internal optics ASICs 11-1 on line shelf 101 as described previously in connection with FIG. 6. FIG. 12 shows how and when to extract information out of launch queues 606-1 through 606-N. As described above, optical switch ASIC 20 sends a reference administrative chunk through transmitter function 1001, through a port of optical switch cartridge 19, through receiver function 1002, and then back to optical switch ASIC 20. Optical switch ASIC 20 uses that reference administrative chunk to determine the reference window that it compares to all other chunks. Optical switch ASIC 20 generates a trigger that goes to optical switch cartridge 19 and instructs DACs 1003 of optical switch cartridge 19 to change the configuration of optical switch 1005. Within optical switch ASIC 20 is a control and status register (CSR), which is used to specify the delay following the trigger until the reference administrative chunk is transmitted, so that it aligns precisely within the "light" period of an optical switch cycle. Thus a precisely specified reference window is placed at optical switch ASIC 20. Both the trigger and the reference administrative chunk are adjustable within a 1.28 nsec resolution, as described above.

Once the timing reference is set up for optical switch ASIC 20, as described above, internal optics ASICs 11-1 (for example), periodically send out their own administrative chunks to optical switch ASIC 20 as the receiver. The administrative chunks from internal optics ASIC 11-1 are sent through an optical transmitter 1202, through optical switch cartridge 19 to an optical receiver 1002, and then received by optical switch ASIC 20. Optical switch ASIC 20 compares the framing symbol of its own reference administrative chunk with the administrative chunk sent by internal optics ASIC 11-1, to determine the "delta" delay between the two. First, it uses a coarse adjustment, as described above, to position the framing symbol of the internal optics ASIC 11-1 administrative chunk sufficiently close to the reference window of optical switch ASIC 20. When sufficiently close, then optical switch ASIC 20 transmits the "delta" between the two framing symbols under comparison within an administrative chunk back through an optical fiber link 1203 to internal optics ASIC 11-1, where it is received by a receiver 1201. All of the information in the administrative chunk is included in the header of that chunk, specifically a coarse adjustment bit used to enable slowly walking the launch delay of the administrative chunk forward in time, and a fine tune adjust value used to adjust the launch delay forward or backward in 640 psec increments. Internal optics ASIC 11-1 applies that "delta" correction factor to launch delay counters 607-1 through 607-N of FIG. 6 to adjust the launch delay.

The administrative chunks that enter optical switch ASIC 20 come from internal optics ASICs 11-1 through an optical fiber that can have a length ranging from roughly 5 meters to roughly 150 meters. Due to this wide range of lengths, it is possible to complete coarse launch delay adjustment for a particular internal optics ASIC source and for the two paths from central arbiter ASIC 13 of FIG. 1 to optical switch ASIC 20 (one path is the grant path through the internal optics ASIC 11-1 and the other is the switch configuration path) to have differing numbers of chunk frame periods. The switch configuration path can vary by an integral number of chunk frame periods.

Central arbiter ASIC 13 of FIG. 4 contains a master chunk counter 411 as previously described, used to mark grants occurring on every Nth chunk period as being from a master chunk cycle. Subsequently, the master chunk indicator is propagated to the internal optics ASIC 11-1. The internal optics ASIC 11-1 builds administrative chunks to launch through optical switches 19 whenever a granted chunk payload from an ingress ASIC 12-1 is not available. Internal optics ASIC 11-1 places the number of chunk periods since the last master chunk period in the administrative chunk's header. The master chunk indicator also follows the optical switch configuration path to the optical switch ASIC. The two master chunk indicators are used by optical switch ASIC 20 of FIG. 12 to determine how many integral chunk frame periods the launch delay at the internal optics ASIC 11-1 must be adjusted. The adjustment is communicated back to the internal optics ASIC using a master chunk adjust field in the header of each administrative chunk.

Referring again to FIG. 6, internal optics ASIC 11-1 contains launch queues 606-1 through 606-N. A launch signal generated from launch delay counters 607-1 through 607-N of internal optics ASIC 11-1 initiates a timing sequence to extract chunks out of a launch queue. As previously described, a clock delay coarse adjustment and a fine adjustment determine when chunks are actually delivered from the launch queue. Coarse adjustment provides a delay of one clock period (64 bits) at a time, about 5 nanoseconds. Once the coarse adjustment places the administrative chunk within the reference window at optical switch ASIC 20, the fine adjustment moves the launch forward or backward in 8 bit increments, each equal to about 640 psec of adjustment, thereby bringing the administrative chunk into precise alignment at optical switch ASIC 20.

Figure 13:
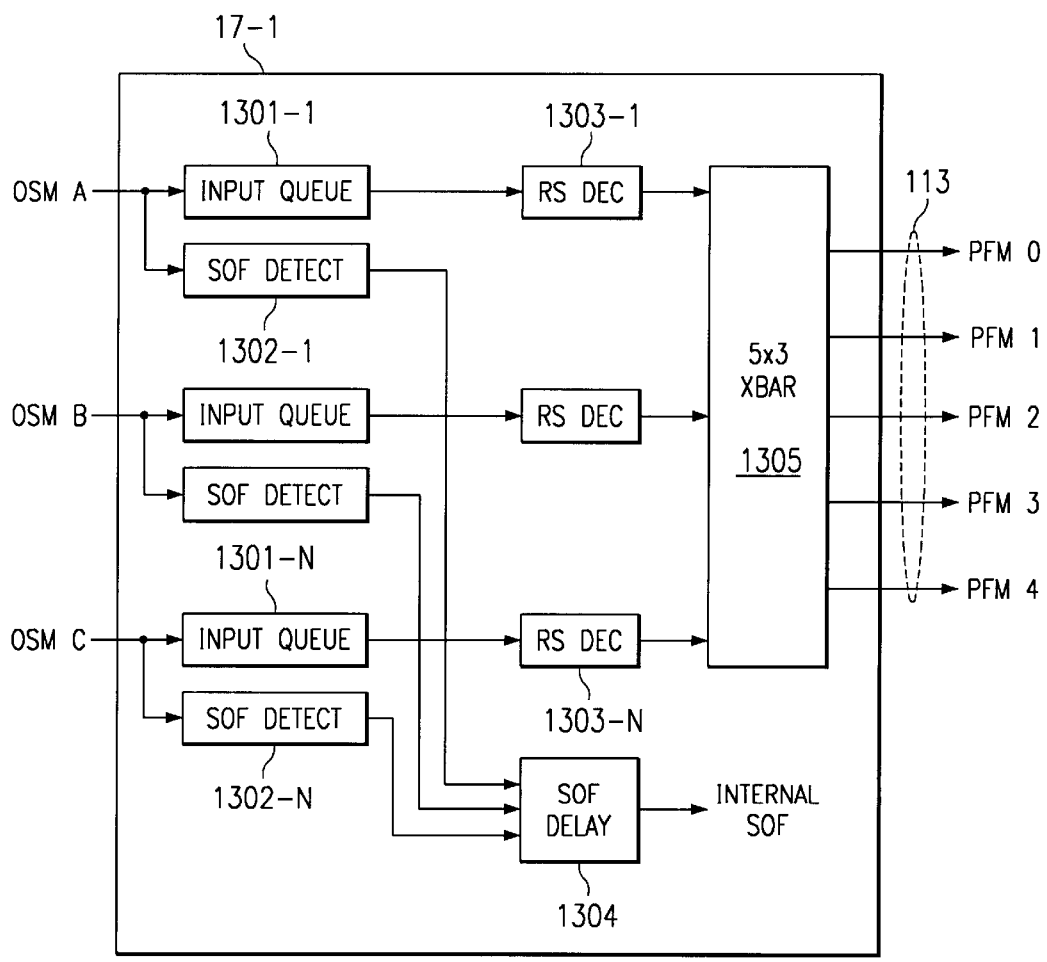
FIG. 13 is a block diagram showing egress internal optics ASIC.

FIG. 13 is a block diagram showing the egress side of internal optics ASIC 17-1, for example. Internal optics ASICs 17-1 through 17-N are responsible for receiving chunks of information from any source, for example one of the ingress internal optics ASIC 11-1 through 11-N or optical switch ASIC 20 through optical switch cartridge 19. Initially, clock and data recovery components on the module with the internal optics ASIC 17-1 align the clocking. The next chunk typically arrives at a different phase, because it originates from a different source. The clock and data recovery components use a preamble in the chunk header as previously described to lock onto the actual data bit phase. Once clock phase has been established, the bit stream then goes through a deserializer to provide a parallel stream of input to internal optics ASIC 17-1. After the parallel data stream enters the internal optics ASIC, the ASIC then must determine the location of the framing symbol to allow the chunk frame information to be extracted.

Periodically, administrative chunks are sent from optical switch ASIC 20 to each internal optics ASIC 17-1. These administrative chunks are keep-alive chunks, which indicate that the modules are still receiving information, even when no data traffic is occurring. Each of egress internal optics ASICs 17-1 through 17-N uses the received administrative chunks as a reference to establish the proper time window to locate framing symbols of both administrative and non-administrative chunk frames.

Using the technique previously described, when one of these ASICs is initialized, it starts receiving administrative chunks or noise, for example, from all of its sources. It randomly positions a window and increments that window forward in time, until it finds the framing symbol for the administrative chunk of optical switch ASIC 20. Once it has locked onto the reference administrative chunk from optical switch ASIC 20, it fixes its timing window, which it then uses to locate the framing symbols of all of the chunks it receives. It will, at times, receive chunks that are not aligned at all to that framing symbol, in which case it will not recognize the framing symbol at all and will discard that information. But as long as egress internal optic ASIC 17-1 through 17-N continues to see the framing information in the proper location relative to the reference administrative chunk from optical switch ASIC 20, it will maintain that framing window. If, for a period of time, it does not find the framing symbol of the reference administrative chunk from optical switch ASIC 20, it will then determine that it has lost framing and will revert to coarse adjustment, slowly moving its window forward in time, until it locates the framing symbol properly.

At a destination (egress) site, fine adjustment is not performed, since the window is large enough to accommodate the arriving chunk information within that window and since all fine adjustment is already performed at the source (ingress). Consequently, framing information received at a destination site of optical switch 19 is used to adjust the internal start of frame generation at SOF delay 1304. A chunk frame should be received from each of the three inputs, optical switch module A, optical switch module B and optical switch module C, at every chunk period. If all three inputs are missing (or outside the timing window), then SOF delay 1304 automatically generates an internal SOF.

In FIG. 13, start of frame of a chunk from optical switch 19 is detected by start of frame detect modules 1302-1 through 1302-N. Internal optics ASIC 17-1 receives the multiple start of frames within roughly the same time period. All optical fibers delivering chunk information to internal optics ASIC 17-1 are within the same fiber cable. The lengths and thus propagation delays of the cable's fibers are closely matched, even though the length of the cable can range from roughly 5 meters to roughly 150 meters. Corresponding chunk information is loaded into input queues 1301-1 through 1301-N. SOF delay module 1304 generates an internal start of frame as previously described. Once an internal start of frame is initiated, it is used to extract information chunks out of input queues 1301-1 through 1301-N, such that they are all aligned within the same clock boundary. The chunks all go through pipeline Reed-Solomon FEC decoders 1303-1 through 1303-N and then through the three respective inputs to crossbar switch 1305. Information in the header of a chunk determines to which of five output destinations PFM-0 through PFM-4 the chunk should be sent. For output links PFM-0 through PFM-4, if a valid data chunk is not available for a particular link, then an idle indicator chunk is inserted into the link, saying that no data is coming at this point in time. Nevertheless, that idle chunk frame still contains a start of frame indicator.

The five links PFM-0 through PFM-4 from the output of crossbar switch 1305 are represented by links 113 in FIG. 1 and are all connected to an egress ASIC 18-1 through 18-N. Although FIG. 1 shows only two egress ASICs 18-1 through 18-N, in FIG. 13 the output of internal optic ASIC 17-1 actually goes to five egress ASICs 18-1 through 18-N. Another aspect of the invention illustrated in FIG. 13 is the function of administrative chunks for internal optics ASIC 17-1. When an administrative chunk is received, it arrives from two different classes of source. One is optical switch ASIC 20, which is used to actually set the frame window at the proper location, to look for the framing symbol of all other chunks. All ingress internal optics ASICs 11-1 through 11-N of FIG. 1 constitute a second source of administrative chunks. Administrative chunks are generated from all sources that could possibly send anything to egress internal optics ASIC 17-1. Internal optics ASIC 17-1 keeps track of the administrative chunks and makes sure periodically that administrative chunks arrive from all sources. Administrative traffic is low enough in frequency that it consumes only roughly one-half percent of the total bandwidth passing through an optical switch. This rate, however, is sufficient to detect problems that can cause complete loss of packets across router 10. The time consumed in handling the appropriate administrative chunks ensures detection and identification of any path through the switch from the source to the destination that has been broken for whatever reason.

Figure 14:
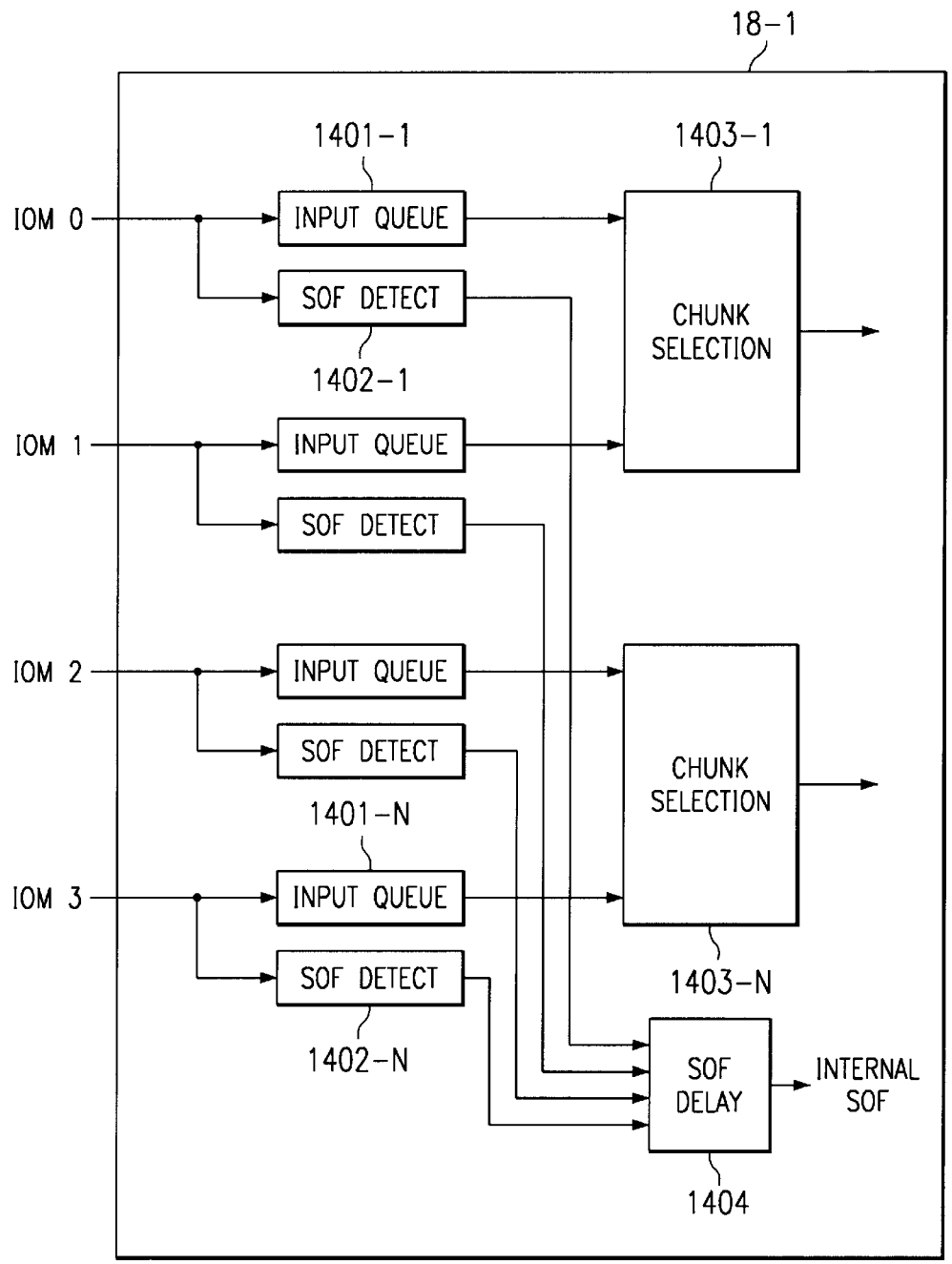
FIG. 14 is a block diagram showing egress ASICs.

FIG. 14 is a block diagram showing egress ASICs 18-1 through 18-N. Egress ASIC 18-1, for example, receives four start of chunk frames through inputs labeled IOM-0 through IOM-3 from egress internal optics ASICs 17-1 through 17-N. The chunk data are loaded into input queues 1401-1 through 1401-N, and the start of frame indicators for the corresponding input frames are detected by SOF detect modules 1402-1 through 1402-N. The result of the detection of the four start of frames goes to a start of frame delay 1404, which as in previous examples generates an internal start of frame by examining all the received start of frames. The internal start of frame must occur slightly later than any of the received start of frames, such that all input data is in the queue before starting to extract it based on the internal start of frame indicator.

The chunk data that enters egress ASIC 18-1 originates from different internal optics ASICs 17-1 through 17-N and their redundant copies. The fiber cable that delivers chunk information to each of the internal optic ASICs can have different lengths, ranging from roughly 5 meters to roughly 150 meters. This length difference will result in arrival times of the chunks being up to roughly two and a half chunk periods apart. Although the chunk data enters the input queues 1401-1 through 1401-N with significant skew, the chunk data must be extracted from the queues on the same internal start of frame.

The central arbiter ASIC 13 of FIG. 4 contains a master chunk counter 411 as previously described. Central arbiter ASIC 13 uses the master chunk counter to mark grants occurring on every Nth chunk period as being from a master chunk cycle. Subsequently, when an ingress ASIC 12-1 (see FIG. 1) receives a grant and builds a chunk payload of data, the master chunk cycle indicator is transferred to than chunk of data. This master chunk cycle is used by egress ASIC 18-1 (see FIG. 14) to determine how long a chunk frame must be held in input queues 1402-1 through 1402-N in order to extract the properly aligned chunks on the same internal start of frame.

Two chunk selection blocks 1403-1 and 1403-N determine which of two chunks received from internal optics ASICs 17-1 through 17-N is to be used to extract IP packets. Not shown in the figures are the redundant optical switch cartridges 19, which carry duplicate sets of information. At the destination, redundant internal optics ASICs 17-1 through 17-N receive and apply forward error correction to exact duplicate copies of the chunk information sent through redundant optical switches 19. Those duplicate copies come back together at egress ASIC 18-1 through 18-N, where it is determined which of the two copies has been correctly decoded. Chunk selection modules 1403-1 through 1403-N choose from the duplicate input queues which chunk to accept. Input queues 1401-1 and 1401-2, for example, can have two chunks that are both perfectly valid. In that case, protection control information is used to choose a default chunk. Once a chunk is selected, packet data proceeds independent of chunk frame timing. Accordingly, once chunk selection is accomplished completely, the chunk is broken down into component packets and segments, and the concept of chunks and chunk frames terminates.

A chunk can contain multiple smaller packets or alternatively a chunk can contain a segment of a larger packet. Once a chunk flows through one of chunk selection modules 1403-1 through 1403-N, it is broken into its component packet pieces, either whole packets or segments of packets. After accumulating multiple chunks, the segments of packets are reassembled into full packets. At that point, the reconstituted packets are inserted into queues, from which they are subsequently extracted to go out an output port to the next router through whatever appropriate link was designated in the packet header of each original packet. Not shown in any of the figures are subsequent operations after the chunks leave chunk selection modules 1403-1, 1403-N, e.g., breaking apart into packet components, reassembly into packets, queuing and transmission, which are not relevant to the description of timing distribution and synchronization in optical switch-based router 10.

Although multiple ASICs have been described above, system performance does not rely on the quantity of any type of ASICs used in any place. For example, in FIG. 1, the precise number of internal optics ASICs 11-1 through 11-N is not relevant. Ingress ASICs 12-1, internal optics ASIC 17-1 on the egress side, as well as egress ASIC 18-1, can include multiple ASICs, but the important issue is not the number of ASICs but rather how they are applied within the system. Moreover, although ASICs represent a preferred class of circuitry in the design of router 10, other circuit architectures and fabrication technologies can be employed, provided that they achieve equivalent performance and functionability.

Although the present invention and its advantages have been described in detail, it should be understood that various changes, substitutions and alterations can be made herein without departing from the spirit and scope of the invention as defined by the appended claims. Moreover, the scope of the present application is not intended to be limited to the particular embodiments of the process, machine, manufacture, composition of matter, means, methods and steps described in the specification. As one of ordinary skill in the art will readily appreciate from the disclosure of the present invention, processes, machines, manufacture, compositions of matter, means, methods, or steps, presently existing or later to be developed that perform substantially the same function or achieve substantially the same result as the corresponding embodiments described herein may be utilized according to the present invention. Accordingly, the appended claims are intended to include within their scope such processes, machines, manufacture, compositions of matter, means, methods, or steps.

What is claimed is:

1. A router system configured for distributing information packets from multiple sources to multiple destinations within a communication network, said router system comprising:

an optical switch having an N by M crossbar configuration, said optical switch being located within the core of said router system and having a plurality of ingress ports and a plurality of egress ports, wherein N is the integer number of ingress ports and M is the integer number of egress ports of said optical switch;

a plurality of modules configured for processing and flow of said information packets and of control signals within said router system, each of said modules being configured to generate timing signals independently, said modules contained in a plurality of equipment racks, such that said modules contained in different racks are interconnected with one another and with said olptical switch through optical fiber cables; and a single active central arbiter interconnected with said optical switch and with said plurality of modules, such that said active central arbiter is disposed to originate timing, synchronization, and configuration control of said optical switch and to synchronize the timing of said plurality of modules.

2. The router system of claim 1 wherein N is equal to M.

3. The router system of claim 1 wherein N is not equal to M.

4. The router system of claim 2 wherein N is greater than 10.

5. The router system of claim 4 wherein N is greater than 40.

6. The router system of claim 5 wherein N is greater than 60.

7. The router system of claim 3 wherein N and M are each greater than 10.

8. The router system of claim 7 wherein N and M are each greater than 40.

9. The router system of claim 8 wherein N and M are each greater than 60.

10. The router system of claim 1 wherein said router system further comprises a plurality of input and output interface ports.

11. The router system of claim 10 wherein each of said input and output interface ports comprises two paired duplicate facility module circuit cards.

12. The router system of claim 11 wherein said paired duplicate facility module cards are connected in parallel to a single packet forwarding module, such that one packet forwarding module is connected to each of said input and output interface ports.

13. The router system of claim 12 wherein a plurality of said packet forwarding modules are interconnected into a protection group having one-for-W protection, said protection group comprising one protect packet forwarding module and W working packet forwarding modules, wherein W is a positive integer greater than two.

14. The router system of claim 12 wherein each of said packet forwarding modules is interconnected with a plurality of internal optics modules, said plurality of internal optics modules comprising:

ingress internal optics modules interconnected with ingress ports of said optical switch; and egress internal optics modules interconnected with egress ports of said optical switch.

15. The router system of claim 14 wherein said router system is disposed in a folded configuration, such that an ingress internal optics module and an egress internal optics module reside on a common circuit card.

16. The router system of claim 11 wherein said router system is disposed in a folded configuration, such that each of said paired duplicate circuit cards contains an input interface port and an output interface port.

17. The router system of claim 14 wherein said internal optics modules are interconnected with said ports of said optical switch through optical fiber cables.

18. The router system of claim 17 wherein the lengths of said optical fiber cables are variable over a range of approximately 5 meters to approximately 150 meters.

19. The router system of claim 14, further comprising a plurality of said optical switches, said optical switches being configured such that each of said internal optics modules is interconnected with multiple optical switches.

20. The router system of claim 19 wherein each of said internal optics modules is interconnected with at least three optical switches.

21. The router system of claim 1 wherein said active central arbiter is interconnected with said optical switch through an optical fiber cable.

22. The router system of claim 21 wherein the length of said optical fiber cable is variable over a range of from approximately 5 meters to approximately 150 meters.

23. The router system of claim 1 wherein said active central arbiter is interconnected with said plurality of modules through a plurality of active arbiter interfaces.

24. The router system of claim 23 wherein said active arbiter interfaces are interconnected with said plurality of modules through a plurality of optical fiber cables.

25. The router system of claim 24 wherein the lengths of said plurality of optical fiber cables are variable over a range of from approximately 5 meters to approximately 150 meters.

26. The router system of claim 1, further comprising a standby central arbiter interconnected with said optical switch and with said plurality of modules, such that in the event of failure of said active central arbiter said standby central arbiter is disposed to originate timing, synchronization, and configuration control of said optical switch and to synchronize the timing of said plurality of modules.

27. The router system of claim 26 wherein said standby central arbiter is interconnected with said optical switch through an optical fiber cable.

28. The router system of claim 26 wherein said standby central arbiter is interconnected with said plurality of modules through a plurality of standby arbiter interfaces.

29. The router system of claim 28 wherein said standby arbiter interfaces are interconnected with said plurality of modules through a plurality of optical fiber cables.

30. The router system of claim 29 wherein the lengths of said plurality of optical fiber cables are variable over a range of from approximately 5 meters to approximately 150 meters.

31. A method of distributing timing and synchronization control within a router system having an optical switch, comprising:
   receiving network packet information at a packet forwarding module;
   determining a timing chunk period at an active central arbiter module;
   reformatting said packet information in response to control from said active central arbiter module into substantially uniform information chunks prior to passing through said optical switch at an optical switch module, such that one said information chunk passes through said optical switch within a chunk frame period, said chunk frame period being defined as a predetermined integral number of said clock cycles of said active central arbiter module;
   passing said information chunk through said optical switch within said chunk frame period; and
   controlling the timing and configuration of said optical switch from said active central arbiter module, such that said optical switch is reconfigured dynamically within a time interval between passing of consecutive information chunks through said optical switch and such that said reconfiguring is synchronized relative to the passing of said information chunks.

32. The method of claim 31 wherein said reformatting further comprises sending requests from said packet forwarding module to said active central arbiter module for grants to pass said packet information through said optical switch;
   receiving said grants at said packet forwarding module from said active central arbiter;
   assembling said packet information into information chunks in accordance with said grants; and
   delivering said information chunks into launch queues prior to passing said information chunks through said optical switch.

33. The method of claim 31 wherein, in the event of failure of said active central arbiter, a standby central arbiter module functions as an active central arbiter module.

34. The method of claim 33 wherein said controlling of timing and configuration comprises employing an echoing technique including:
   generating a first start of frame at said active central arbiter module;
   propagating said start of frame to said standby central arbiter module;
   generating an echo start of frame back to said active central arbiter module from said standby central arbiter module in response to the arrival of said propagating start of frame;
   detecting said echo start of frame at said active central arbiter module;
   adjusting the delay of said first start of frame at said active central arbiter module by a time approximately equal to a desired arrival delay of said echo start of frame at said active central arbiter module minus one-half of the measured arrival delay of said echo start of frame, thereby;aligning the start of frame of said standby central arbiter module relative to the start of frame of said active central arbiter module; and
   applying substantially the above technique to align the start of frame of said packet forwarding modules and said optical switch modules relative to the start of frame of said active central arbiter module.

35. The method of claim 34 wherein said desired arrival delay is approximately equal to an integral number of chunk frame periods.

36. The method of claim 35 wherein said start of frames are aligned with one another within an uncertainty of less than plus/minus 10 nanoseconds.

37. The method of claim 31 wherein said controlling of timing and configuration further comprises:
   at a receiving location within said router system receiving multiple chunk frames at multiple arrival times from multiple sources within said router system;

separating start of frame indicators from said multiple received chunk frames;

loading the data of said multiple chunk frames into queues;

comparing the arrival times of said multiple start of frame indicators;

generating a local start of frame after a delay equaling at least one chunk frame period plus the delay of the last received start of frame relative to the first received start of frame; and applying said local start of frame indicator to extract said multiple chunk frame data simultaneously from said queues.

38. The method of claim 32 wherein said controlling of timing and configuration further comprises:

at said active central arbiter module generating configuration and timing control frames for said optical switch;

delivering said configuration and timing control frames to said optical switch module;

inserting said configuration and timing control frames into a first control queue;

generating a delayed start of frame in response to start of frames of said configuration and timing control frames;

in response to said delayed start of frame, initiating multiple stages of delay dependent on the arrival times of information chunks at said launch queues;

after said multiple stages of delay, shifting the switch configuration information for the next optical switch cycle from said first control queue into a second control queue;

in response to a predetermined delayed trigger, extracting said switch configuration information from said second control queue and applying said switch configuration information to configure said optical switch; and in response to said predetermined delayed trigger, extracting said information chunk for the same next optical switch cycle from said launch queue and launching said information chunk through said optical switch.

39. The method of claim 38 wherein the overall time delay from generating said configuration and timing control frames until launching said information chunk through said optical switch is six chunk frame periods.

40. The method of claim 32 wherein said controlling of timing and configuration further comprises a dynamic feedback loop.

41. The method of claim 40 wherein said dynamic feedback loop comprises:

generating an administrative chunk at a source router module, said administrative chunk containing a framing symbol;

launching said administrative chunk to a target router module through said optical switch;

looking for said framing symbol of said administrative chunk within a timing window at said target router module;

if said framing symbol is not detected, then repetitively moving said timing window forward in time in regular increments relative to said optical switch cycle, and after each increment relaunching said administrative chunk and then looking again for said framing symbol; and if said framing symbol is detected, then fixing said timing window relative to said optical switch cycle.

42. The method of claim 41 wherein said source router module is selected from the group consisting of an optical switch ASIC, an internal optics ASIC, and an ingress ASIC.

43. The method of claim 41 wherein said target router module is selected from the group consisting of an optical switch ASIC, an internal optics ASIC, and an ingress ASIC.

44. The method of claim 41 wherein said target router module is said source router module.

45. The method of claim 41 wherein said time increment is approximately 5 nanoseconds.

46. The method of claim 41 further comprising, after said timing window is fixed, periodically launching, switching, and detecting said administrative chunks, such that said administrative chunks act as keep alive chunks.

47. The method of claim 41 wherein said controlling of timing and configuration further comprises:

after said timing window is fixed, determining the delay between detecting a framing symbol generated by a first source router module and detecting a framing symbol generated by a second source router module; and applying the determined delay to adjust the future launch time of said second source router module relative to said first source router module until said determined delay is zero within a predetermined timing resolution.

48. The method of claim 47 wherein said predetermined timing resolution is approximately 1.28 nanoseconds.

49. The method of claim 31 wherein each said information chunk contains approximately 400 bytes of data and passes through said optical switch in approximately 330 nanoseconds.

50. The method of claim 31 wherein said optical switch is reconfigured in a switching time ranging from approximately 32 nanoseconds to approximately 40 nanoseconds.

51. The method of claim 31 wherein said time interval between passing successive information chunks through said optical switch is approximately 50 nanoseconds.

52. The method of claim 31 wherein said reconfiguring is synchronized relative to the passage of said information chunk within a precision of approximately plus or minus five parts per million.

53. A communication network comprising:

a switching fabric;

a plurality of modules configured for processing and flow of said information packets and of control signals, each of said modules being configured to generate timing signals independently, said modules contained in a plurality of equipment racks, such that said modules contained in different racks are interconnected with one another and with said switching fabric;

a single active central arbiter interconnected with said switching fabric and with said plurality of modules, such that said active central arbiter is disposed to originate timing, synchronization, and configuration control of said switching fabric and to synchronize the timing of said plurality of modules; and a standby central arbiter interconnected with said switching fabric and with said plurality of modules, such that in the event of failure of said active central arbiter said standby central arbiter is disposed to originate timing, synchronization, and configuration control of said switching fabric and to synchronize the timing of said plurality of modules.

54. The communication network of claim 53 wherein said active central arbiter is interconnected with said plurality of modules through a plurality of active arbiter interfaces and said standby central arbiter is interconnected with said plurality of modules through a plurality of standby arbiter interfaces.

55. The communication network of claim 53 wherein said plurality of modules further comprises a plurality of input and output interface ports.

56. The communication network of claim 55 wherein each of said input and output interface ports comprises two paired duplicate facility module circuit cards.

57. The communication network of claim 56 wherein said paired duplicate facility module cards are connected in parallel to a single packet forwarding module, such that one packet forwarding module is connected to each of said input and output interface ports.

58. The communication network of claim 57 wherein a plurality of said packet forwarding modules are interconnected into a protection group having one-for-W protection, said protection group comprising one protect packet forwarding module and W working packet forwarding modules, wherein W is a positive integer greater than two.

59. The communication network of claim 56 wherein each of said paired duplicate circuit cards contains one of said input interface ports and one of said output interface ports.

60. The communication network of claim 53, further comprising a router system, said router system incorporating said switching fabric, said active and said standby central arbiters, and said plurality of modules.

61. A method of distributing timing and synchronization control within a router system having a switching fabric, comprising:
   receiving network packet information at a packet forwarding module;
   determining a chunk period at an active central arbiter module;
   reformatting said packet information in response to control from said active central arbiter module into substantially uniform information chunks prior to passing through said switching fabric, such that one said information chunk passes through said switching fabric within a chunk frame period, said chunk frame period being defined as a predetermined integral number of said clock cycles of said active central arbiter module;
   passing said information chunk through said switching fabric within said chunk frame period;
   controlling the timing and configuration of said switching fabric from said active central arbiter module, such that said switching fabric is reconfigured dynamically within a time interval between passing of consecutive information chunks through said switching fabric and such that said reconfiguring is synchronized relative to the passing of said information chunks; and
   in the event of failure of said active central arbiter, controlling the timing and configuration of said switching fabric from a standby central arbiter module, such that said standby central arbiter module functions as an active central arbiter module.

62. The method of claim 61 wherein said reformatting further comprises sending requests from said packet forwarding module to said active central arbiter module for grants to pass said packet information through said switching fabric;
   receiving said grants at said packet forwarding module from said active central arbiter;
   assembling said packet information into information chunks in accordance with said grants; and
   delivering said information chunks into launch queues prior to passing said information chunks through said switching fabric.

63. The method of claim 61 wherein said controlling of timing and configuration comprises employing an echoing technique including:
   generating a first start of frame at said active central arbiter module;
   propagating said start of frame to said standby central arbiter module;
   generating an echo start of frame back to said active central arbiter module from said standby central arbiter module in response to the arrival of said propagating start of frame;
   detecting said echo start of frame at said active central arbiter module;
   adjusting the delay of said first start of frame at said active central arbiter module by a time approximately equal to a desired arrival delay of said echo start of frame at said active central arbiter module minus one-half of the measured arrival delay of said echo start of frame, thereby aligning the start of frame of said standby central arbiter module relative to the start of frame of said active central arbiter module; and
   applying substantially the above technique to align the start of frame of said packet forwarding modules and said switching fabric modules relative to the start of frame of said active central arbiter module.

64. The method of claim 63 wherein said desired arrival delay is approximately equal to an integral number of chunk frame periods.

65. The method of claim 64 wherein said start of frames are aligned with one another within an uncertainty of less than plus or minus 10 nanoseconds.

66. The method of claim 61 wherein said controlling of timing and configuration further comprises:
   at a receiving location within said router system receiving multiple chunk frames at multiple arrival times from multiple sources within said router system;
   separating start of frame indicators from said multiple received chunk frames;
   loading the data of said multiple chunk frames into queues;
   comparing the arrival times of said multiple start of frame indicators;
   generating a local start of frame after a delay equaling at least one chunk frame period plus the delay of the last received start of frame relative to the first received start of frame; and
   applying said local start of frame indicator to extract said multiple chunk frame data simultaneously from said queues.

67. The method of claim 62 wherein said controlling of timing and configuration further comprises:
   at said active central arbiter module generating configuration and timing control frames for said switching fabric;
   delivering said configuration and timing control frames to said switching fabric;
   inserting said configuration and timing control frames into a first control queue;
   generating a delayed start of frame in response to start of frames of said configuration and timing control frames;
   in response to said delayed start of frame, initiating multiple stages of delay dependent on the arrival times of information chunks at said launch queues;
   after said multiple stages of delay, shifting the switching configuration information for the next switching cycle from said first control queue into a second control queue;

in response to a predetermined delayed trigger, extracting said switching configuration information from said second control queue and applying said switching configuration information to configure said switching fabric; and in response to said predetermined delayed trigger, extracting said information chunk for the same next switching cycle from said launch queue and launching said information chunk through said switching fabric.

68. The method of claim 67 wherein the overall time delay from generating said configuration and timing control frames until launching said information chunk through said switching fabric is six chunk frame periods.

69. The method of claim 62 wherein said controlling of timing and configuration further comprises a dynamic feedback loop.

70. The method of claim 69 wherein said dynamic feedback loop comprises:

generating an administrative chunk at a source router module, said administrative chunk containing a framing symbol;

launching said administrative chunk to a target router module through said switching fabric;

looking for said framing symbol of said administrative chunk within a timing window at said target router module;

if said framing symbol is not detected, then repetitively moving said timing window forward in time in regular increments relative to said switching cycle, and after each increment relaunching said administrative chunk and then looking again for said framing symbol; and if said framing symbol is detected, then fixing said timing window relative to said switching cycle.

71. The method of claim 70 wherein said source router module is selected from the group consisting of an optical switch ASIC, an internal optics ASIC, and an ingress ASIC.

72. The method of claim 70 wherein said target router module is selected from the group consisting of an optical switch ASIC, an internal optics ASIC, and an ingress ASIC.

73. The method of claim 70 wherein said target router module is said source router module.

74. The method of claim 70 wherein said time increment is approximately 5 nanoseconds.

75. The method of claim 70 further comprising, after said timing window is fixed, periodically launching, switching, and detecting said administrative chunks, such that said administrative chunks act as keep alive chunks.

76. The method of claim 70 wherein said controlling of timing and configuration further comprises:

after said timing window is fixed, determining the delay between detecting a framing symbol generated by a first source router module and detecting a framing symbol generated by a second source router module; and applying the determined delay to adjust the future launch time of said second source router module relative to said first source router module until said determined delay is zero within a predetermined timing resolution.

77. The method of claim 76 wherein said predetermined timing resolution is obtained by reducing jitter of a trigger signal using trigger logic operating at a higher clock rate than the clock rate of said central arbiter module.

78. The method of claim 76 wherein said predetermined timing resolution is approximately 1.28 nanoseconds.

79. The method of claim 67 wherein a master chunk period equal to N chunk frame periods is used to adjust said multiple stages of delay for multiple delay paths having multiple chunk periods of delay variability.

80. The method of claim 79 wherein said master chunk period is determined in said central arbiter module and is propagated to said switch fabric through two different paths.

81. The method of claim 79 wherein N equals 16.

\* \* \* \* \*